US008848664B2

(12) United States Patent
Cheng et al.

(10) Patent No.: US 8,848,664 B2
(45) Date of Patent: Sep. 30, 2014

(54) COMMUNICATION METHOD FOR A MOBILE TERMINAL AND MOBILE TERMINAL

(75) Inventors: Hong Cheng, Singapore (SG); Pek Yew Tan, Singapore (SG); Takako Hori, Osaka (JP); Toyoki Ue, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 28 days.

(21) Appl. No.: 13/274,870

(22) Filed: Oct. 17, 2011

(65) Prior Publication Data
US 2012/0033640 A1 Feb. 9, 2012

Related U.S. Application Data

(62) Division of application No. 11/577,178, filed as application No. PCT/JP2005/019027 on Oct. 17, 2005, now Pat. No. 8,345,678.

(30) Foreign Application Priority Data

Oct. 15, 2004 (JP) ................ 2004-302134
Oct. 27, 2004 (JP) ................ 2004-312189
Sep. 30, 2005 (JP) ................ 2005-287432

(51) Int. Cl.
*H04W 4/00* (2009.01)
*H04L 12/725* (2013.01)
*H04W 80/04* (2009.01)

(52) U.S. Cl.
CPC ............ *H04L 45/302* (2013.01); *H04W 80/04* (2013.01)
USPC ......................... 370/331; 370/338

(58) Field of Classification Search
USPC .................................. 370/331, 338
See application file for complete search history.

(56) References Cited

U.S. PATENT DOCUMENTS

2002/0141393 A1   10/2002   Eriksson
2003/0053453 A1    3/2003   Ono
(Continued)

FOREIGN PATENT DOCUMENTS

JP   2003/092599   3/2003
JP   2003/249951   9/2003
JP   2004/007197   1/2004

OTHER PUBLICATIONS

European Search Report dated Jun. 16, 2011.

(Continued)

*Primary Examiner* — Jason Mattis
(74) *Attorney, Agent, or Firm* — Dickinson Wright PLLC

(57) ABSTRACT

A technique for flexibly performing processes depending on the type of a path for providing an additional service when there are a plurality of paths for providing additional services for the same session between terminals communicating with each other over a network is disclosed. According to the technique, when a mobile terminal (MN 100) establishes a QoS path using NSIS to a corresponding node (CN 124) on different types of data communication paths, a signaling message including information (MIE) representing the path type is created and transmitted. Each node (QNE) with an NSIS QoS function, which has received the message, identifies a plurality of QoS paths by comparing the MIE, a session identifier and a flow identifier, and performs processing of the QoS paths according to control information (CI) from MNs or/and the policy which the QNE has.

8 Claims, 14 Drawing Sheets

(56) References Cited

U.S. PATENT DOCUMENTS

| | | |
|---|---|---|
| 2003/0076838 A1 | 4/2003 | Shaio |
| 2003/0083066 A1 | 5/2003 | Shin |
| 2003/0088676 A1* | 5/2003 | Smith et al. .................. 709/227 |
| 2004/0008689 A1 | 1/2004 | Westphal |
| 2006/0129630 A1* | 6/2006 | Catalina-Gallego et al. . 709/203 |

OTHER PUBLICATIONS

T. Sanda, et al., "Pre CRN discovery from proxy on candidate new path," Network Working Group Internet Draft, Feb. 2004, pp. 1-12.

T. Sanda, et al., "Path type support for NSIS signaling draft," NSIS Working Group Internet Draft, Oct. 2004, pp. 1-15.

S. Lee, et al, "Applicability Statement of NSIS Protocols in Mobile Environments," IETF Next Steps in Signaling Internet Draft, Jul. 2005, pp. 1-53.

International Search Report dated Nov. 8, 2005.

Y. Tajima, at al., "A Traffic Engineering Scheme in a Global Networking Service Platform," Technical Report of IEICE, SSE2000-268, IN2000-224, Mar. 2001, pp. 241-248 and bibliography page.

C. Perkins, "IP Mobility Support for IPv4," Network Working Group, Jan. 2002, pp. 1-98.

D. Johnson, et al., "Mobility Support in IPv6," Network Working Group, Jun. 2004, pp. 1-165.

R. Braden, et al., "Resource ReSerVation Protocol (RSVP)," Network Working group, Sep. 1997, pp. 1-112.

S. Van den Bosch, et al., "NSLP for Quality-of-Service Signalling," Internet Draft, draft-ietf-nsis-qos-nslp-04.txt, Jul. 19, 2004, pp. 1-70.

D. Durham, et al., "The COPS (Common Open Policy Service) Protocol," Network Working Group, Jan. 2000, pp. 1-38.

J. Manner, et al., "NSLP for Quality-of-Service Signalling," Internet Draft, <draft-ietf-nsis-qos-nslp-07.txt>, Jul. 2005, pp. 1-68.

* cited by examiner

FIG. 4A

EVENT TRIGGER 400

Mobility Event Trigger::=
       ⟨ Interface Index ⟩,    ········ 410
       ⟨ Event Type ⟩,     ········ 412
       ⟨ Path Type ⟩,     ········ 414
       ⟨ Address Information ⟩,  ········ 416
       ⟨ Event Attribute ⟩,   ········ 418

FIG. 4B

EVENT TYPE 412

0x01::= "ADDRESS REGISTRATION PROCESSING COMPLETION"  ········ 420

0x02::= "COMMUNICATION WITH SPECIFIC NODE HAS BEEN DISCONNECTED"  ········ 422

0x03::= "STATE OF LINK LAYER HAS CHANGED"  ········ 424

0x04::= "CONNECTION-ACCEPTING SIDE AR HAS CHANGED"  ········ 426

FIG. 4C

PATH TYPE 414

0x01::= "TRIANGLE PATH"  ········ 428
0x02::= "OPTIMIZED PATH"  ········ 430

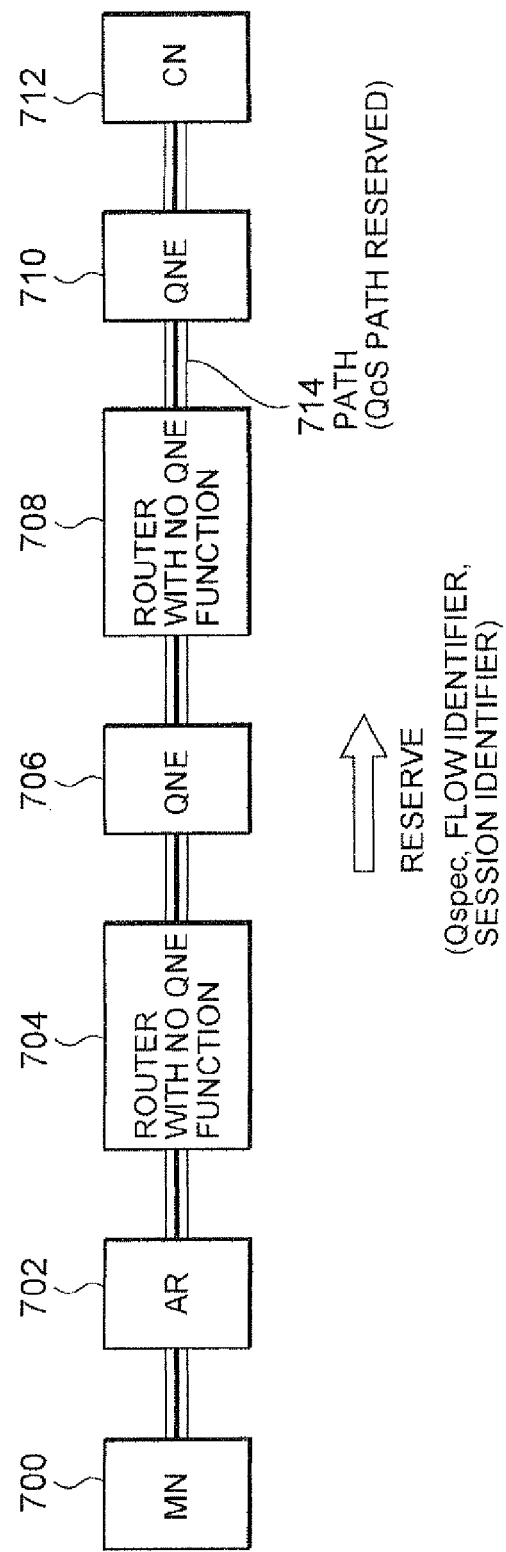

COMMUNICATION METHOD FOR A MOBILE TERMINAL AND MOBILE TERMINAL

This is a divisional application of application Ser. No. 11/577,178 filed Apr. 12, 2007, which is a national stage of PCT/JP2005/019027 filed Oct. 17, 2005, which is based on Japanese Application No. 2004-302134 filed Oct. 15, 2004, Japanese Application No. 2004-312189 filed Oct. 27, 2004, and Japanese Application No. 2005-287432 filed Sep. 30, 2005, the entire contents of each of which are incorporated by reference herein.

TECHNICAL FIELD

The present invention relates to a communication method and a communication message processing method for terminals which communicate with each other over a network, and a program for executing these methods on a computer, and, more particularly, to a communication method and a communication message processing method which relate to providing communication paths for mobile terminals which execute wireless communication using a mobile IP, the next generation Internet Protocol (IP) with a QoS (Quality of Service) guarantee using NSIS (Next Step in Signaling), and a program for executing these methods on a computer.

BACKGROUND ART

As a technique capable of providing seamless connection of a communication network, such as the Internet, to a user who accesses the communication network via a wireless network from a mobile terminal while moving, a technique using a mobile IP which is the next generation Internet Protocol is becoming popular. The wireless communication system using this mobile IP will be described referring to FIG. 1. The technique of the mobile IP that will be described below is disclosed in, for example, Non-patent Document 1 and Non-patent Document 2 mentioned below.

The communication system shown in FIG. 1 includes a network (communication network) 170, such as the Internet, a plurality of subnetworks (hereinafter "subnets") 102, 126 connected to the network 170, a mobile terminal (MN: Mobile Node) 100 connectable to any one of those subnets 102, 126, and a corresponding terminal (CN: Corresponding Node) 124 which communicate with the MN 100 via the network 170. FIG. 1 shows two subnets 102, 126 as a plurality of subnets. While the network 170 is constructed by routers (QNE: QoS NSIS Entities) 108, 112, 120, 122, 132 which can provide additional services, such as QoS to be described later, a node (HA: Home Agent) 116 having a function of registering the terminal position of a mobile IP to be described later, and links 140, 142, 144, 146, 148, 150, 152, 156, 158, 160, 162, 164 which connect those components, as network elements, other configurations may be possible as the configuration of the network 170. FIG. 1 shows a QNE or a router having the function of NSIS QoS to be described later, as a router which can provide an additional service.

In FIG. 1, let a path 180 be a path going through the MN 100, an AP 104, an AR 106, the link 140, the QNE 108, the network 110, the link 142, the QNE 112, the link 144, the network 114, the link 146, the HA 116, the link 148, the network 118, the link 150, the QNE 120, the link 152, the QNE 122, the link 156, and the CN 124. Let a path 182 be a path going through the MN 100, an AP 104, an AR 106, the link 140, the QNE 108, the network 110, the link 164, the QNE 120, the link 152, the QNE 122, the link 156, and the CN 124. Let a path 184 be a path going through the MN 100, an AP 128, an AR 130, the link 158, the QNE 132, the network 134, the link 160, the QNE 112, the link 144, the network 114, the link 146, the HA 116, the link 148, the network 118, the link 150, the QNE 120, the link 152, the QNE 122, the link 156, and the CN 124. Let a path 186 be a path going through the MN 100, the AP 128, the AR 130, the link 158, the QNE 132, the network 134, the link 162, the QNE 122, the link 156, and the CN 124.

The subnet 102 comprises an access router (AR) 106 which performs routing of IP packets, and a plurality of access points (AP) 104 having a specific wireless coverage area (communicatable area). The AP 104 is connected to the AR 106 which is connected to the IP network 170. FIG. 1 shows one AP 104 as a plurality of APs in the subnet 102. The subnet 126 likewise comprises an AR 130 and a plurality of APs 128 in the same connection mode as that of the subnet 102.

The AR 106 as a constituting element of the subnet 102 and the AR 130 as a constituting element of the subnet 126 can communicate with each other via the IP network 170, i.e., the subnet 102 and the subnet 126 are connected together via the IP network 170.

Suppose that in the wireless communication system shown in FIG. 1, the MN 100 has started wireless communication with the AP 104 in the subnet 102. At this time, when an IP address assigned to the MN 100 is not compatible with the IP address system of the subnet 102, the MN 100 present in the subnet 102 acquires an IP address compatible with the subnet 102, or a care of address (CoA) by wireless communication with the AP 104.

In a mobile IP, a home agent (HA) is placed as a node which manages the position of an MN. The MN 100 registers (BU: Binding Update) the CoA acquired from the subnet 102 in the HA 116. At the time of registration, the HA 116 has corresponding information (Binding Cache) of a home address (HoA) of the MN 100 which does not depend on the subnet to which the MN 100 moves, and the CoA. Accordingly, at the time the MN 100 transmits/receives data packets to/from the CN 124, with regard to transmission from the MN 100 to the CN 124, a data packet having the HoA of the MN 100 as a sender and the IP address of the CN 124 as a sendee is encapsulated with an IP header having the CoA of the MN 100 as a sender and the IP address of the HA 116 as a sendee, and is first sent to the HA 116 where the data packet is decapsulated, and is then sent to the CN 124. With regard to transmission from the CN 124 to the MN 100, a data packet having the IP address of the CN 124 as a sender and the HoA of the MN 100 as a sendee is sent to the MN 100, and is received by the HA 116, and the data packet is encapsulated with an IP header having the IP address of the HA 116 as a sender and the CoA of the MN 100 as a sendee, and is sent to the MN 100 present in the subnet 102 to which the MN 100 moves. The MN 100 receives the packet from the HA 116 and extracts and processes the encapsulated content. Accordingly, even though the MN 100 is communicating with the CN 124 over the moving destination subnet, the CN 124 sees it as if the MN 100 were communicating therewith over the home network using the HoA, thus ensuring continuous bidirectional communications without being aware of the movement of the MN 100. In this case, the path (path 180) along which data packet to be transmitted and received between the MN 100 and the CN 124 passes through the HA 116 is called "triangle path".

This triangle path becomes a path which should pass the HA 116 in communications between the MN 100 and the CN 124 and is not an optimal path (which hereinafter may also called optimized path). To transmit and receive a data packet in an optimal path, the MN 100 can optimize the path by sending BU to the CN 124 and performs a position registration process with respect to the CN 124 when the CN 124 has a path optimizing function. That is, because the CN 124 can know the HoA of the MN 100 and corresponding information of the CoA that the MN 100 is currently using upon reception of the BU from the MN 100, a data packet from the CN 124 which is addressed to the MN 100 can be sent through an optimal path without going through the HA 116 with the CN 124 being a sender and the CoA of the MN 100 as a sendee, and likewise, an optimal path (path 182) without intervening the HA 116 can be used for a data packet to be sent to the CN 124 from the MN 100 with the CoA of the MN 100 being a sender. When the optimized path cannot be used (e.g., when the MN 100 has moved to the subnet 126 so that the CoA which has been used so far cannot be used), a data packet to be sent to the MN 100 from the CN' 124 is sent again to the HoA (i.e., the HA 116).

According to the specifications of a mobile IP (Non-patent Document 1 and Non-patent Document 2), when the MN 100 acquires a new CoA to be used under a new subnet, it is necessary to first perform BU to the HA 116. That is, data packets to be transmitted and received between the MN 100 and the CN 124 pass through a triangle path until the MN 100 later performs BU to the CN 124 to enable the use of an optimized path.

In communications using a network, there are services including QoS guarantee (such a service will be herein called an additional service), and there are multifarious communication protocols to realize such an additional service. Of those multifarious communication protocols, the RSVP (Resource Reservation Protocol) is an example of a protocol for QoS guarantee (e.g., Non-patent Document 3 to be mentioned below). The RSVP reserves a band on the path where the flow of data packets from a sender communication terminal which transmits data to a receiver communication terminal which receives data passes, thus ensuring smooth transfer of data from the sender communication terminal to the receiver communication terminal.

Further, as a protocol to solve the problem of the RSVP such that it is not designed to cope with movement of a terminal, there is a protocol, NSIS, whose standardization is being discussed at present in the NSIS working group in the IETF (Internet Engineering Task Force). The NSIS is expected to be particularly effective for various additional services including QoS guarantee in a mobile environment, and there are documents describing requirements and a method for realizing QoS guarantee and mobility service (e.g., Non-patent Document 4 to be mentioned below). A method of establishing a QoS path using the NSIS will be described below.

Next, one example of the conventional QoS path establishing method will be described referring to FIG. 9. It is assumed that an MN 700 subordinate to an AR 702 is scheduled to receive, or is receiving (is currently receiving), data from a CN 712 for some purpose. With regard to the purpose, in a case of receiving a moving picture distributed from the CN 712, for example, a sequence of operations from the initiation of the application to the end thereof is called session. In establishing a QoS path, the MN 700 generates a session identifier to identify a session and a flow identifier to identify a flow. The flow identifier depends on the addresses of the sender and sendee of a data packet, e.g., the CoA of the MN 700 and the IP address of the CN 712. When the MN 700 moves to another subnet so that the CoA is changed, the flow identifier changes according to a change in the CoA of the MN 700. The session identifier, unlike the flow identifier, does not change according to the movement of a terminal.

Next, the MN 700 sends the CN 712 a RESERVE message which is a message for causing a router (QNE) having an NSIS QoS protocol stack to reserve a desired QoS resource. The RESERVE message includes desired QoS information (Qspec) for reception of data from the CN 712, and the generated flow identifier and session identifier. The transmitted RESERVE message reaches a QNE 706 via an AR 702 and a router 704 which does not have a QNE function. The QNE 706 reserves the QoS resource described in the Qspec included in the RESERVE message for this session. At the time of making the reservation, the QNE 706 stores the session identifier, the flow identifier and information of the previous QNE by one (MN 700 here) which has received the RESERVE message, as a state. The RESERVE message which has passed the QNE 706 reaches a QNE 710 via a router 708 which does not have the QNE function. The QNE 710 performs a process similar to the one performed by the QNE 706 to reserve a QoS resource and store a state. This operation is repeated and the RESERVE message is finally supplied to the CN 712, thereby establishing a QoS path 714 between the MN 700 and the CN 712.

Next, the aggregation of a session in NSIS will be described. As described in Non-patent Document 6 mentioned below, the NSIS supports aggregation of a session. The aggregation of a session is to organize a plurality of paths into one, and execute management and processing thereof.

Referring now to FIG. 10, a description will be given of a signaling message which is to be transmitted when a session is aggregated in the NSIS. FIG. 10 is a diagram exemplarily showing one example of aggregation supported by the conventional NSIS.

In FIG. 10, a QNE 1002 and QNE 1006 are located at edges of an aggregation domain, and a QNE 1004 is shown as a representative of QNEs present within the aggregation domain. An end-to-end (E2E) signaling message E2E_A (session identifier: A) which is transmitted to a QNE 1010 from a QNE 1000 passes through the QNE 1002, QNE 1006 and a QNE 1008. An E2E signaling message E2E_B (session identifier: B) which is transmitted to a QNE 1014 from a QNE 1012 passes through the QNE 1002 and the QNE 1006.

The two E2E signaling messages are aggregated between the QNE 1002 and the QNE 1006. That is, within the aggregation domain, an aggregation signaling message Agg_C (session identifier: C) for the aggregation domain is transmitted from the QNE 1002 or the QNE 1006, and the aggregation signaling message Agg_C passes through the QNE 1004.

The QNE 1002 and the QNE 1006 are notified of information indicating that the E2E signaling message E2E_A and the E2E signaling message E2E_B are aggregated into the aggregation signaling message Agg_C, by using a parameter, BOUND_SESSION_ID.

For example, when the E2E signaling message E2E_A is transmitted from the QNE 1000 and reaches the QNE 1002 which is the entrance of the aggregation domain, the BOUND_SESSION_ID parameter is added to the E2E signaling message E2E_A, and information indicating which session identifier is used in the aggregation domain (i.e., session identifier C) is stored in the BOUND_SESSION_ID parameter. When the E2E signaling message E2E_A having the BOUND_SESSION_ID parameter added thereto reaches the QNE 1006 which is the exit of the aggregation domain, the BOUND_SESSION_ID parameter is removed from the E2E signaling message E2E_A.

Likewise, when the E2E signaling message E2E_B is transmitted from the QNE 1012 and reaches the QNE 1002 which is the entrance of the aggregation domain, the BOUND_SESSION_ID parameter is added to the E2E signaling message E2E_B, and the session identifier C is stored in the BOUND_SESSION_ID parameter as in the case of the E2E signaling message E2E_A. When the E2E signaling message E2E_B having the BOUND_SESSION_ID parameter added thereto reaches the QNE 1006 which is the exit of the aggregation domain, the BOUND_SESSION_ID parameter is removed from the E2E signaling message E2E_B. The information on the aggregation of the session identifier which is notified by the BOUND_SESSION_ID parameter may be stored in the QNE 1002 or the QNE 1006 which respectively is the entrance or the exit of the aggregation domain.

Meanwhile, the BOUND_SESSION_ID parameter is also used to associate different sessions with each other in addition to aggregation. Referring now to FIG. 11, a description will be given of a signaling message to be transmitted to associate different sessions with each other in the NSIS.

FIG. 11 is a diagram exemplarily showing one example of association of different sessions supported by the conventional NSIS. In FIG. 11, an E2E signaling message E2E_A (session identifier A) and an E2E signaling message E2E_D (session identifier D) are messages associated with each other. When a QNE 1100 and a QNE 1110 are bidirectionally communicating with each other using a VoIP (Voice over Internet Protocol), for example, the E2E signaling message E2E_A is a signaling message for QoS management which is transmitted to the QNE 1110 from the QNE 1100 via QNEs 1102, 1106 and 1108 with respect to this VoIP session, while the E2E signaling message E2E_D is a signaling message for QoS management which is transmitted to the QNE 1100 from the QNE 1110 (i.e., in the opposite direction to that of the E2E signaling message E2E_A) via QNEs 1120, 1106 and 1108 with respect to this VoIP session.

In this case, when a telephone session ends and a QoS path from the QNE 1100 to the QNE 1110 is released, for example, a QoS path from the QNE 1000 to the QNE 1100 is also released at the same time if the association of the session identifier A with the session identifier D is known beforehand. For this purpose, the BOUND_SESSION_ID parameter is used.

That is, the BOUND_SESSION_ID parameter is added to the E2E signaling message E2E_A, and the session identifier D is stored in the BOUND_SESSION_ID parameter. The BOUND_SESSION_ID parameter may also be added to the E2E signaling message E2E_A, with the session identifier A stored in the BOUND_SESSION_ID parameter. Accordingly, the E2E signaling message E2E_A is associated with the E2E signaling message E2E_D by the session identifier D. Related information of the session identifier that is notified by the BOUND_SESSION_ID parameter may be stored in each QNE.

While the NSIS covers various functions in an ordinary static network as well as the mobile environment, it is assumed herein that paying attention to the function of establishing a mobility-supported additional service which is one of the functions of the NSIS, the implementation of the NSIS achieves the establishment of a mobility-supported additional service.

Non-patent Document 1: C. Perkins, et. al., "IP Mobility Support for IPv4", IETF RFC 3220
Non-patent Document 2: D. Johnson, C. Perkins, J. Arkko, "Mobility Support in IPv6", IETF RFC 3775
Non-patent Document 3: R. Braden, et. al., "Resource Reservation Protocol", IETF RFC 2205
Non-patent Document 4: S. Van Den Bosch, et. al., "NSLP for Quality-of-Service signaling", IETF Internet Draft draft-ietf-nsis-qos-nslp-04.txt
Non-patent Document 5: D. Durham, Ed., "The COPS (Common Open Policy Service) Protocol", IETF RFC 2748
Non-patent Document 6: Sven Van den Bosch, Georgios Karagiannis and Andrew McDonald "NSLP for Quality-of-Service signaling", draft-ietf-nsis-qos-nslp-07.txt, July 2005

Let us consider establishment of an NSIS-used QoS path on a path (data path) where the flow of a data packet passes between MN and CN in the mobile IP. As mentioned above, with an MN being subordinate to a subnet, there are two paths, a triangle path and an optimized path, in a data path, and a QoS path is established for the two paths. This case requires some means to identify if the two QoS paths are established for the triangle path or established for the optimized path. This is because when a QoS path is present between two terminals and another QoS path for the same session has further been established or is about to be established between those two terminals according to the conventional NSIS, the QoS path previously established is basically released. Because the triangle path is used when the optimized path becomes unavailable for some reason, however, it is desirable that the QoS path for the triangle path should not be released when the QoS path for the optimized path is established.

As means for leaving a QoS path established so far unreleased at the time of establishing another QoS path as in the aforementioned case according to the conventional NSIS, means for setting a REPLACE flag to "No Replace" at the time of establishing another QoS path has been introduced. However, this means leaves all the QoS paths for the same session which are present between same two terminals, and does not cope with a flexible process such that when an MN moves and tries to establish a new QoS path with a CN under a new subnet, of two QoS paths (for a triangle path and for an optimized path) established under the original subnet, only the QoS path for the triangle path is left while the QoS path for the optimized path is released. Further, with regard to QoS paths, it is required to execute a specific process for a specific path in addition to a process of determining whether or not to release a QoS path. That is, when an MN is present under a subnet and a QoS path for an optimized path is established after establishing a QoS path for a triangle path, for example, the QoS path for the triangle path is left unreleased but a process of reducing reserved QoS resources is required.

In a case of overcoming the problem using the conventional NSIS means, there may be a method of instructing the flow identifier of a QoS path for which an MN performs a specific process and the process, both included in a signaling message. However, the flow identifier is comprised of other information including the sender and sendee addresses of a data packet, and has a large amount of information, so that the method of adding this flow identifier to a signaling message and transmitting it applies a load to the network. As another problem, this method cannot be adapted when there are a plurality of QoS paths having the same flow identifier for the same session. Because a QoS path for a triangle path and a QoS path for an optimized path are established between the same terminals, it is likely that the paths have the same flow identifier the future discussion in the NSIS working group.

As another method of overcoming the problem using the conventional NSIS means, there may be a method of using different session identifiers for a QoS path for a triangle path and a QoS path for an optimized path. The use of the method can allow the QoS path for a triangle path and the QoS path for an optimized path to be treated as independent QoS paths. However, in a case of avoiding double resource reservation at a portion where a QoS path for a triangle path and a QoS path for an optimized path overlap, for example, information which associates the two session identifiers with each other is needed, resulting in that a large amount of information is included in a signaling message as in the above-described case. Further, this method is inconsistent with the definition that a session identifier "identifies a session".

When the circumstances illustrated in FIG. 10 and FIG. 11 occur at the same time, a problem relating to the type of a path also arises. FIG. 12 is an exemplary diagram for explaining the problem when aggregation signaling message Agg_of sessions and association of different sessions are executed at the same time according to the related art.

It is assumed that in FIG. 12, the E2E signaling message E2E_A and the E2E signaling message E2E_D relating to each other are used between a QNE 1200 and a QNE 1210, and the E2E signaling message E2E_A and the aggregation signaling message Agg_C are aggregated between a QNE 1202 and a QNE 1206.

That is, as shown in FIG. 12, the E2E signaling message E2E_A which is sent to the QNE 1210 from the QNE 1200 via the QNE 1202, the QNE 1206, and a QNE 1208 and the E2E signaling message E2E_D which is sent to the QNE 1200 from the QNE 1210 via a QNE 1220, the QNE 1206, and the QNE 1202 are associated with each other, and the QNE 1202 and the QNE 1206 are positioned at edges of the aggregation domain that has a QNE 1204 inside.

In this case, two BOUND_SESSION_ID parameters, namely, the BOUND_SESSION_ID parameter where the session identifier C indicating the association with the aggregation signaling message Agg_C is stored and the BOUND_SESSION_ID parameter where the session identifier D indicating the association with the E2E signaling message E2E_D is stored need to be added into the E2E signaling message E2E_A.

According to the present NSIS specifications, however, it is not possible to add a plurality of BOUND_SESSION_ID parameters into a single signaling message or store a plurality of session identifiers in a single BOUND_SESSION_ID parameter.

If the present NSIS specifications supports to add a plurality of BOUND_SESSION_ID parameters into a single signaling message or store a plurality of session identifiers in a single BOUND_SESSION_ID parameter, the QNE 1202 and the QNE 1206 cannot distinguish two BOUND_SESSION_ID parameters or a plurality of session identifiers included in a BOUND_SESSION_ID parameter.

In a case where two BOUND_SESSION_ID parameters, in one of which the session identifier C indicating aggregation is stored and in the other one of which the session identifier D indicating the association with a different session is stored, are added to the E2E signaling message E2E_A in the QNE 1202, the QNE 1206 cannot instantaneously distinguish which one of the session identifiers respectively stored in the two BOUND_SESSION_ID parameters is for aggregation and which session identifier is for identifying an associated session by referring to the session identifiers stored in the BOUND_SESSION_ID parameters.

Although the QNE 1206 can distinguish the BOUND_SESSION_ID parameter for aggregation by, for example, checking the session identifier used in the aggregation domain (i.e., session identifier C) and comparing this session identifier with the session identifier in the BOUND_SESSION_ID parameter, the QNE 1206 always needs to execute the session identifier check process and comparison process, thus raising a problem of increasing the process load of the QNE 1206.

There may be a solution of distinguishing the session identifier stored in the BOUND_SESSION_ID parameter by providing, in a BOUND_SESSION_ID parameter, a field having information capable of distinguishing the BOUND_SESSION_parameter for aggregation from the BOUND_SESSION_ID parameter for identifying an associated session beforehand. In this case, however, the parameter length becomes longer by that field, and it is necessary to perform a process on the BOUND_SESSION_D parameter after checking the field, thus increasing the process load of the QNE 1206.

DISCLOSURE OF INVENTION

In view of the problems, it is an object of the invention to provide a communication method and a communication message processing method for flexibly performing processes depending on the type of a path for providing an additional service when there are a plurality of paths for providing additional services for the same session between terminals communicating with each other over a network is disclosed, and a program for allowing a computer to execute those methods.

To achieve the object, according to the present invention, there is provided a communication method for a terminal configured to communicate with a corresponding terminal using a plurality of communication paths for providing additional services respectively having path types for a single session through routers having a function relating to provision of additional services, the communication method including:

a detection step of allowing the terminal to detect a change relating to each of the plurality of communication paths;

an identification step of allowing the terminal to identify the path type of each of the plurality of communication paths detected in the detection step;

a path-type identifier generation step of generating a path-type identifier for identifying the path type of each of the plurality of communication paths based on information on the path type identified in the identification step;

a signaling message generation step of generating a signaling message for controlling the additional service provided to each of the plurality of communication paths, the signaling message including the path-type identifier relating to each of the plurality of communication paths; and a signaling message transmission step of transmitting the signaling message including the path-type identifier relating to each of the plurality of communication paths to the routers present on the respective communication paths.

The configuration can notify the type of a communication path to a router having a function associated with provision of an additional service.

Further, in addition to the above-described configuration, the communication method according to the present invention includes a path-type identifier storage step of storing information of each of the communication paths for providing a plurality of additional services together with the path-type identifier for identifying the path type of each of the communication paths.

The configuration can allow a terminal to hold information on the path type of each of a plurality of communication paths which are currently used, together with the path type identifier.

Still additionally, combined with the above-mentioned configuration, the communication method according to the present invention comprises a control method holding step of holding information relating to a control method for the communication paths for each of the path types of the communication paths or a combination of the path types.

This configuration enables the terminal to hold the information relating to the communication path control method specified for each of combinations of the path types.

Yet additionally, combined with the above-mentioned configuration, the communication method according to the present invention comprises a control method deciding step of deciding the control method corresponding to the path type of each of the plurality of communication paths by referring to the information relating to the control method held in the control method holding step, and a control method adding step of further including the information relating to the control method decided in the control method deciding step into the signaling message generated in the signaling message generation step.

This configuration enables the terminal to determine the control method specified for each communication path type and further to notify the information relating to this control method to a router having a function for an offer of an additional service.

Moreover, combined with the above-mentioned configuration, the communication method according to the present invention comprises a server communicating step of communicating with a specific server which holds information relating to a control method for the communication paths for each of the path types of the communication paths or a combination of the path types, thereby acquiring the information relating to the control method, a control method deciding step of deciding the control method corresponding to the path type of each of the plurality of communication paths by referring to the information relating to the control method acquired in the server communication step, and a control method adding step of further including the information relating to the control method decided in the control method deciding step into the signaling message generated in the signaling message generation step.

This configuration enables the terminal to determine a control method specified for each of the path types of the communication paths by making a communication with a predetermined server and further to notify the information relating to this control method to a router having a function for an offer of an additional service.

To achieve the object, according to the present invention, there is provided a communication method for a terminal configured to communicate with a corresponding terminal using a plurality of communication paths for providing additional services respectively having path types for a single session through routers having a function relating to provision of additional services, comprising:

a detection step of allowing the terminal to detect changes relating to the communication paths, an identification step of allowing the terminal to identify the path type of each of the plurality of communication paths detected in the detection step, a message generation step of generating a message including information on the path type identified in the identification step for each of the plurality of communication paths, and a message transmission step of transmitting the message generated in the message generation step to a specific proxy node having functions of generating a path-type identifier for identifying the path type of each of the plurality of communication paths based on information on the path type in the message, generating a signaling message for controlling the additional service provided to each of the plurality of communication paths, the signaling message including the path-type identifier relating to each of the plurality of communication paths, and transmitting the signaling message including the path-type identifier relating to each of the plurality of communication paths to the routers present on the respective communication paths.

This configuration enables the terminal to notify the type of a communication path to a router having a function for an offer of an additional service through the use of a predetermined proxy node.

In addition, combined with the above-mentioned configuration, in the communication method according to the present invention, the terminal is a mobile terminal having a wireless mobile band communication function, and changes relating to the communication paths originating from movement of the terminal are detected in the detection step.

This configuration notifies the type of a communication path to a router having a function for an offer of an additional service in accordance with the detection of a change of the communication path stemming from the movement of the terminal (change if connection-accepting side access point or access router).

Still additionally, combined with the above-mentioned configuration, the communication method according to the present invention further comprises a link status monitor step of monitoring a status of a link of a wireless access point with which the terminal is currently communicating or to which the terminal is able to hand over, and the signaling message including a request for the additional service in consideration of the link status is generated in the signaling message generation step.

This configuration enables the terminal to, in consideration of a status of an access point in addition to the path type and the control method, transmit the information related to a request for an additional service (i.e., Qspec) to a router on a path through which the additional service is offered.

Yet additionally, combined with the above-mentioned configuration, in the communication method according to the present invention, the terminal has a mobile IP function, and changes relating to the communication paths are detected by reception of a position registration completion message relating to the mobile IP in the detection step.

This configuration enables the terminal to immediately transmit a signaling message related to an offer of an additional service to a router on a path determined by a position registration after the completion of the position registration in the mobile IP.

Moreover, combined with the above-mentioned configuration, in the communication method according to the present invention, the path-type identifier identifies a triangle path or an optimal path in the mobile IP.

This configuration enables the terminal to transmit a signaling message including information for identifying a triangle path or an optimal path in the mobile IP.

Still moreover, combined with the above-mentioned configuration, in the communication method according to the present invention, the terminal has a plurality of interfaces and is configured to communicate with the corresponding terminal using each of the plurality of interfaces, and the path-type identifier identifies each of the plurality of interfaces.

This configuration enables the terminal to, in a case in which a communication is made with the corresponding terminal through the use of each of a plurality of interfaces, transmit a signaling message including information for identifying which of the interfaces is used for the communication.

Yet moreover, combined with the above-mentioned configuration, in the communication method according to the present invention, when the terminal has sessions relating to one another, a same session identifier is given to the sessions relating to one another, and the path-type identifier is information indicating a direction of the sessions relating to one another.

With this configuration, the sessions associated with each other can be indicated by the same session identifier, and the direction of the sessions associated with each other can be indicated by a path-type identifier, which enables the considerable shortening of the message length. Further, this configuration eliminates the need for the association using a BOUND_SESSION_ID parameter, which allows the BOUND_SESSION_ID to be used for only the association of aggregations, thereby reducing the additional processing in a router having a function related to an offer of an additional service and positioned at an edge of an aggregation domain.

In addition, combined with the above-mentioned configuration, in the communication method according to the present invention, the additional service is a QoS guarantee.

With this configuration, the terminal can transmit a signaling message for controlling the QoS guarantee for each of a plurality of paths each having a path type.

Still additionally, according to the present invention, there is provided a program for allowing a computer to execute the communication method.

Furthermore, to achieving the above-mentioned purpose, in accordance with the present invention, a communication message processing method in a router located on at least one of a plurality of communication paths for providing additional services respectively having path types at a time a terminal communicates with a corresponding terminal using the plurality of communication paths for a single session, the communication message processing method, comprising:

a signaling message reception step of receiving a signaling message for controlling the additional service provided to each of the plurality of communication paths, the signaling message including a path-type identifier for identifying the path type of the communication path having the router located thereon, a state storage step of creating and storing a state relating to the additional service including the path-type identifier in the signaling message received in the signaling message reception step, a state processing method deciding step of deciding a state processing method relating to provision of the additional service based on the path type indicated by the path-type identifier, and a state processing step of processing a state relating to the path type which is provided with the additional service, based on the state processing method decided in the state processing deciding step.

With this configuration, a router having a function for an offer of an additional service stores a state related to the additional service in a condition associated with a path-type identifier for identifying a path type, thereby allowing the management of the state based on the path type.

Combined with the above-mentioned configuration, in the communication message processing method, the signaling message for controlling the additional service provided to the communication path has an area in which information relating to a control method for the communication path can be included.

This configuration enables a control method with respect to each communication path for an offer of an additional service to be seized on the basis of the information contained in the received signaling message.

In addition, combined with the above-mentioned configuration, in the communication message processing method, when information relating to a control method for the communication path is included in the signaling message received in the signaling message reception step, the state processing method relating to provision of the additional service is decided in the state processing deciding method based on the information relating to the control method.

With this configuration, a router having a function for an offer of an additional service can carry out the state processing according to a request from a terminal.

Still additionally, combined with the above-mentioned configuration, the communication message processing method comprises a control method holding step of holding information relating to a control method for the communication paths for each of the path types of the communication paths or a combination of the path types, and wherein the state processing method relating to provision of the additional service is decided in the state processing deciding method based on the information relating to the control method.

With this configuration, a router having a function for an offer of an additional service can carry out the state processing on the basis of the information on the control method it holds.

Yet additionally, combined with the above-mentioned configuration, the communication message processing method comprises a server communicating step of communicating with a specific server which holds information relating to a control method for the communication paths for each of the path types of the communication paths or a combination of the path types, thereby acquiring the information relating to the control method for the communication paths, and wherein the state processing method relating to provision of the additional service is decided in the state processing deciding method based on the information relating to the control method.

With this configuration, a router having a function for an offer of an additional service can decide a control method specified for each of the path types of the communication paths by carrying out a communication with a predetermined server and can notify the information on this control method to a router having a function for an offer of an additional service.

Moreover, combined with the above-mentioned configuration, the communication message processing method comprises a path discrimination step of discriminating whether the path type of the communication path is a triangle path or an optimal path in mobile IP by referring to the path-type identifier in the signaling message received in the signaling message reception step.

With this configuration, a router having a function for an offer of an additional service can identify the QoS path established on each of the triangle path and the optimal path in the mobile IP.

Still moreover, combined with the above-mentioned configuration, the communication message processing method comprises:

a flow identifier comparison step of referring to a flow identifier relating to the signaling message received in the signaling message reception step to determine whether or not there is a state relating to a same flow identifier stored in that state storage step, and a crossover determination step of, when there is the state relating to the same flow identifier in the flow identifier comparison step, determining whether or not the terminal is a crossover node for the triangle path and the optimal path established under a same subnet or under different subnets by comparing a previous hop node which has received the signaling message and a next hop node which transmits the signaling message with a previous hop node and a next hop node relating to the same flow identifier which are stored in the state storage step.

This configuration can specify that the mobile terminal is a crossover node for an QoS path for a triangle path and a QoS for an optimal path, established under a same subnet or different subnets, thereby carrying out the appropriate processing with respect to each of the QoS paths.

Yet moreover, combined with the above-mentioned configuration, the communication message processing method comprises an interface discrimination step of discriminating which one of a plurality of interfaces the path type of the communication path indicates as an interface used by the terminal having the interfaces in communication by referring to the path-type identifier in the signaling message received in the signaling message reception step.

With this configuration, a router having a function for an offer of an additional service can identify which one of a plurality of interfaces the path type of the communication path indicates as an interface used by the terminal having the interfaces in communication.

In addition, combined with the above-mentioned configuration, in the communication message processing method, when the terminal has sessions relating to one another, a same session identifier is given to the sessions relating to one another, and the path-type identifier is information indicating a direction of the sessions relating to one another.

With this configuration, the sessions associated with each other can be indicated by the same session identifier, and the direction of the sessions associated with each other can be indicated by a path-type identifier, which enables the considerable shortening of the message length. Further, this configuration eliminates the need for the association using a BOUND_SESSION_ID parameter, which allows the BOUND_SESSION_ID to be used for only the association of aggregations, thereby reducing the processing load in a router having a function related to an offer of an additional service and positioned at an edge of an aggregation domain.

Still additionally, combined with the above-mentioned configuration, in the communication message processing method, the signaling message has a content included in a RESERVE message in an NSIS QoS message.

This configuration enables appropriate processing to be conducted with respect to each of a plurality of communication paths for an offer of an additional service through the use of a conventional RESERVE message.

Furthermore, according to the present invention, there is provided a communication message processing method program for allowing a computer to execute the above-described communication message processing method.

The present invention has the above-described configurations, and has an advantage in that, in a case in which there are a plurality of paths for the offer of additional services with respect to a same session among terminals which make communications with each other through a network, it is possible to carry out flexible processing in accordance with the type of each path for offering an additional service.

BRIEF DESCRIPTION OF THE DRAWINGS

FIG. 4A is an illustrative view showing one examples of information and event trigger to be transmitted from a function in the interior of an MN which has detected a change of a connection situation to a function in the interior of an MN which carries out a control on a signaling message, in the first embodiment of the present invention.

FIG. 4B is an illustrative view showing one examples of information and event type to be transmitted from a function in the interior of an MN which has detected a change of a connection situation to a function in the interior of an MN which carries out a control on a signaling message, in the first embodiment of the present invention.

FIG. 4C is an illustrative view showing one examples of information and path type to be transmitted from a function in the interior of an MN which has detected a change of a connection situation to a function in the interior of an MN which carries out a control on a signaling message, in the first embodiment of the present invention.

FIG. 9 is an illustrative view showing how a QoS resource reservation is conducted in an NSIS according to a conventional technique.

BEST MODE FOR CARRYING OUT THE INVENTION

First Embodiment

Figure 1:
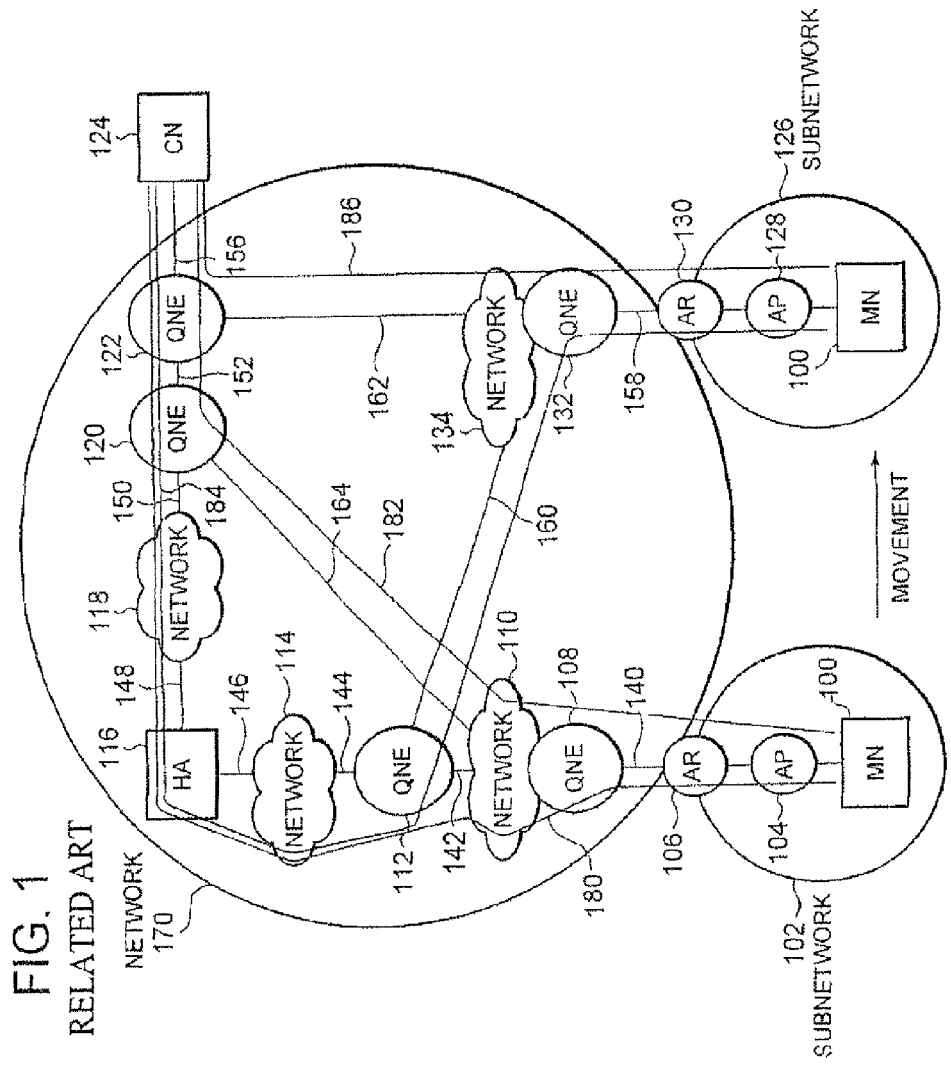
FIG. 1 is an illustrative view showing a configuration of a communication system according to a conventional technique and a first embodiment of the present invention.

A first embodiment of the present invention will be described hereinbelow with reference to the drawings. FIG. 1 is an illustrative view showing a configuration of a communication system according to a first embodiment of the present invention. The description of the first embodiment of the present invention will be given on the basis of the communication system shown in FIG. 1 for the explanation of the conventional technique. Moreover, the respective components of the communication system shown in FIG. 1 are similar to those described in the conventional technique, and the description thereof will be omitted.

First, a description will be given of a function of an MN 100. The MN 100 has a function to, with respect to a plurality of paths for offering an additional service set with respect to one session, recognize a type of each of the plurality of paths respectively having different types and further has a function to determine and transmit an appropriate signaling message based on the type of that path for the purpose of controlling the respective paths. These functions will be described with reference to FIG. 2.

Figure 2:
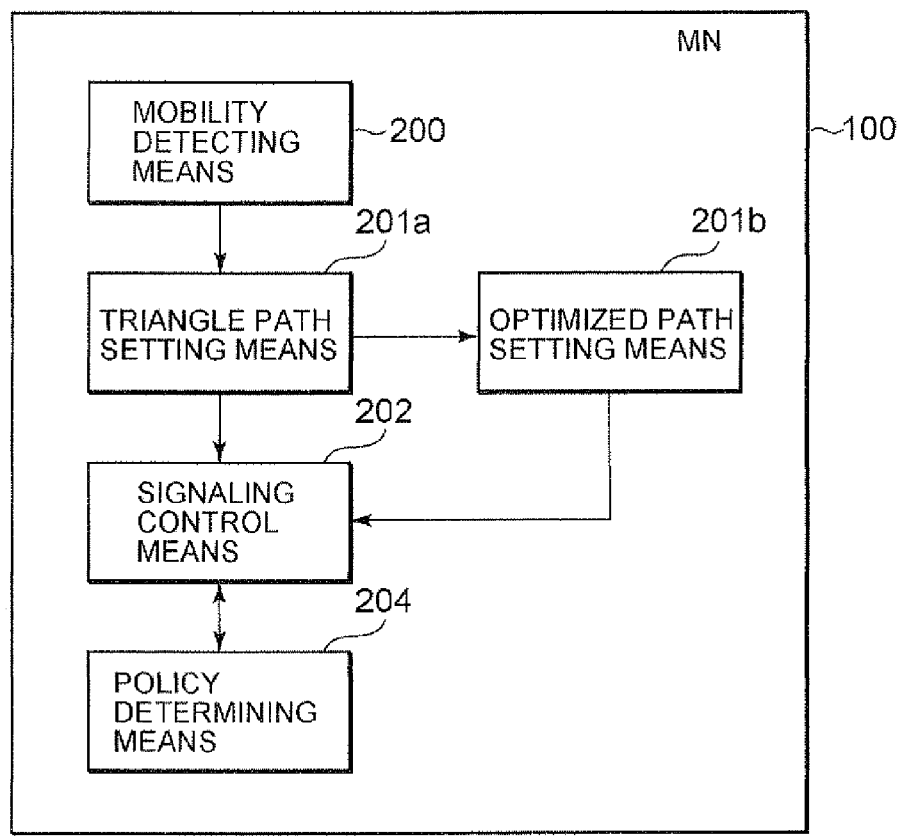
FIG. 2 is a block diagram showing a configuration of an MN according to the first embodiment of the present invention.

FIG. 2 is a block diagram showing a configuration of the MN 100 according to the first embodiment of the present invention. Although in FIG. 2 the respective functions of the MN 100 are shown as blocks, these functions are realizable with hardware and/or software. In particular, the principal processing (processing in the respective steps mentioned later with reference to FIGS. 5 and 6) according to the present invention are executable with a computer program.

The MN 100 shown in FIG. 2 is made up of a mobility detecting means 200, a triangle path setting means 201a, an optimized path setting means 201b, a signaling control means 202 and a policy determining means 204.

The mobility detecting means 200 is a means to detecting the movement of the MN 100. For example, in a case in which this MN 100 makes a communication using the mobile IPv6 (Internet Protocol version 6), this mobility detecting means 200 is interlocked with the processing in the mobile IPv6 layer or a link layer related thereto and, for example, it detects the fact of a change of a connection-accepting side AP or connection-accepting side AR of the MN 100.

The triangle path setting means 201a is a means to set a path (for example, the path 180 shown in FIG. 1) which passes through the MN 100 and an HA 116 and makes a transmission/reception of a data packet to/from a CN 124. Concretely, it has a function to carry out BU message transmission processing for registering a CoA, acquired in a subnet connected thereto, in the HA 116, and other processing.

In addition, when the state of the MN 100 changes due to movement, for example, in a case in which the MN 100 acquires a new CoA and completes the registration processing with respect to the HA 116 so that the data packet communication using a triangle path becomes feasible, the triangle path setting means 201a hands an event trigger 400 over to the signaling control means 202 which will be mentioned later.

The optimized path setting means 201b is a means to, when the CN 124 has a path optimization function, set an optimal path (for example, the path 182 shown in FIG. 1) for directly carrying out the transmission/reception of a data packet with respect to the CN 124 without intervening the HA 116 after the setting of a triangle path. Concretely, the optimized path setting means 201b has, for example, a function to carry out the BU message transmission processing for registering a CoA, acquired in a subnet connected thereto, in the CN 124.

After a triangle path is set with respect to the CN 124, for example, when the MN 100 completes the registration processing with respect to the CN 124 so that the data packet communication using an optimized path becomes feasible, the optimized path setting means 201b delivers the event trigger to the signaling control means 202 which will be mentioned later.

A description will be given hereinbelow of the event trigger 400. FIG. 4A illustratively shows one example of information included in the event trigger 400 to be delivered from the triangle path setting means 201a or the optimized path setting means 201b to the signaling control means 202. The event trigger 400 contains, for example, an interface index 410, an event type 412, a path type 414, an address information 416 and an event attribute 418.

The interface index 410 is information on, of the communication interfaces of the MN 100, an interface relating to the occurrence of a movement. This information is useful, for example, in a case in which the MN 100 has a plurality of interfaces.

The event type 412 is information indicating the reason why the event trigger 400 has occurred. For example, as shown in FIG. 4A, the event trigger 400 is generated when the address registration processing has reached completion, when a communication with a specific node has been disconnected, when a situation of a link layer has changed, when a change of the connection-accepting side AR has changed, or in other cases, and the reason for the occurrence of the event trigger 400 becomes discriminable by the event type 412. FIG. 4B shows the respective occurrence reasons through the use of values (values of 0x01 to 0x04) contained in the event type 412, and these values can be set in an arbitrary manner. Moreover, likewise, the reasons for the occurrence of the event trigger 400 are not limited to the above-mentioned four occurrence reasons, but it is also acceptable that the event type indicates other arbitrary occurrence reasons.

The path type 414 is information indicative of the type of a path for the communication where the event trigger 400 has occurred. Among the path types, for example, there are a triangle path, an optimized path and others in the mobile IP. FIG. 4C shows a triangle path and an optimized path through the use of values (0x01 and 0x02) included in the path type 414, but these values can be set arbitrarily. Likewise, the path types are not limited to the above-mentioned triangle path and optimized path, but other arbitrary path types can be indicated with the path type 414.

In the first embodiment of the present invention, the setting for a triangle path is made by the triangle path setting means 201a of the MN 100 shown in FIG. 2, and the setting for an optimized path is made by the optimized path setting means 201b of the MN 100 shown in FIG. 2. Accordingly, the value (0x01) indicative of the triangle path is set in the path type 414 of the event trigger 400 outputted from the triangle path setting means 201a of the MN 100 shown in FIG. 2, and the value (0x02) indicative of the optimized path is set in the path type 414 of the event trigger 400 outputted from the optimized path setting means 201b of the MN 100 shown in FIG. 2.

Moreover, the address information 416 is information containing an IP address of each of nodes, needed when the signaling control means 202, mentioned later, carries out the processing. For example, in a case in which the content of the event type 412 is "address registration processing completion (420) and the path type is "optimized path (430)", the address information contains the information on a CoA used by the MN 100 and the IP address of the CN 124 with respect to the communication where this event trigger 400 has occurred. In the meantime, in a case in which the event type 412 is "address registration processing completion (420) and the path type is "triangle path (428)", in addition to the CoA of the MN 100 and the IP address of the CN 124, it contains the information on the IP address of the HA 116.

The event attribute 418 is information containing additional information. For example, if the content of the event type 412 is "status of the link layer has changed (424)", in the event attribute 418, there are indicated the contents of the changed status, for example, the support situation of an QoS and others. Thus, the signaling control means 202, mentioned later, can generate a signaling message for establishing a QoS path in consideration of the status change of this link layer.

Incidentally, each of the event trigger 400 in FIG. 4A, the event type 412 in FIG. 4B and the path type 414 in FIG. 4C is only one example, and other forms are also acceptable provided that the event trigger 400 contains information for specifying a path and information indicative of the classification of this path (i.e., information equivalent to the path type 414 shown in FIG. 4C), and it is also possible to contain other information.

The signaling control means 202 is a means to carry out the processing related to a signaling message. First, after the reception of the event trigger 400 from the above-mentioned triangle path setting means 201a or the optimized path setting means 201b, the signaling control means 202 generates a signaling message (signaling message for an additional service) for controlling an additional service, which contains information indicative of the type of a path (for example, in the case of a communication using the mobile IP, information indicative of a triangle path or an optimized path). The information indicative of the type of the path contained in this signaling message will hereinafter be referred to as a mobility information element (MIE). For example, this MIE can be a flag using one bit or several bits, or it can also be a numeric value corresponding to each of the types of paths. Moreover, it is also acceptable that the signaling message for the control of an additional service, which is to be generated in this case, is obtained by extending a conventional signaling message for the control of an additional service. For example, in a case in which an additional service is a QoS using an NSIS, a message is generated by putting the MIE in an NSIS signaling message (for example, a RESERVE message). With this MIE, even in a case in which, for example, an NSIS QoS path for a triangle path established between the MN 100 and the CN 124 is the same as an NSIS QoS path flow identifier for an optimized path, the identification of the two is feasible.

Moreover, in addition to a path for an additional service which is established with respect to the CN 124 through the use of the generated signaling message, when one or a plurality of same additional service paths respectively having different types exist with respect to a same session for a same CN 124, the signaling control means 202 can put control information (CI), indicative of a method of handling these paths, in the signaling message. For example, in the case of handling a QoS path using the NSIS in a communication using the mobile IP, when a QoS path for an optimized path is established between the MN 100 and the CN 124 in a state where a QoS path for a triangle path exists between the MN 100 and the CN 124, it corresponds to the information on a method of handling the triangle path QoS path established in advance. For example, this information (CI) can be a flag using one bit or several bits, or it can also be a numeric value for each processing determined in advance. Still moreover, it is also appropriate that the signaling control means 202 stores a database or the like describing a control method based on the type of a QoS path or a control method based on a combination of path types for determining a CI indicating a path handling method by referring to this database.

In this connection, in the case of handling a QoS path using the NSIS in a communication using the mobile IP as an example in which two or more same additional service paths respectively having different types already exist in conjunction with the same session for the same CN 124, it is considered that a QoS path for a triangle path is divided into a section between the MN 100 to HA 116 and a section between the HA 116 and the CM 124 and these two sections are handled as paths having separate types. In this case, separate MIEs are allocated to the QoS path between the MN 100 to the HA 116 and the QoS between the HA 116 and the CN 124. In such a case, it is also acceptable that the CI and the MIE for this path are sent together for specifying the type of the path to be processed by the CI. In a case in which a QoS path for a triangle path is divided into a section between the MN 100 to HA 116 and a section between the HA 116 and the CN 124 and these two sections are handled as paths having separate types, when a QoS path is established between the HA 116 and the CN 124, there is a need for the HA 116 to replace the MIE relating to the path between the MN 100 to the HA 116 and the MIE relating to the path between the HA 116 and the CN 124 with each other, and the HA 116 can contain an MIE replacement function.

Furthermore, it is also appropriate that, as shown in FIG. 2, the MN 100 includes a policy determining means 204. The signaling control means 202 can make a replacement of information with respect to the policy determining means 204 when additional information is acquired at the generation of a signaling message or in the case of the determination of the aforesaid CI.

This policy determining means 204 is a means for offering information on an additional service, and it has a configuration whereby, for example, when the additional service is a QoS, a system in the MN 100 can recognize information indicative of the level of the QoS a user making a communication using this MN 100 desires (for example, information indicative of the user desiring a low-cost QoS) and other information. It is also acceptable that, for example, this information is installed in the MN 100 in advance, or that the user selects it through a pop-up menu on a display of the MN 100 or the like when the user starts a communication.

In addition, this additional information can be a request from an additional service provider side. For example, in the case of offering an QoS using the NSIS in a communication using the mobile IP, when a QoS path for an optimized path is established between the MN 100 and the CN 124 in a state where a QoS path for a triangle path exists between the MN 100 and the CB 124, the policy determining means 204 has information indicating how to handle a triangle path QoS path established in advance (for example, information indicating that 30% of the required QoS resource is allocated to the triangle path side while 70% of the required QoS resource is allocated to the optimized path side for making a resource reservation) in a state where a system in the MN 100 can recognize it. This information can be installed in the MN 100 in advance, or it can also be downloaded from a server, the additional service provider possesses, when the user starts a communication. In this connection, it is also acceptable that the policy determining means 204 is not placed in the MN 100 as shown in FIG. 2 but the policy determining means 204 is placed in a policy server or the like, the additional service provider possesses, and the information is acquired through a communication with this policy server when the aforesaid signaling control means 202 generates a signaling message.

Like the examples shown in FIGS. 4A to 4C, in a case in which the event trigger 400 includes information other than the information needed for the determination of an MIE, this information can be used for the generation of a signaling message. For example, in a case in which the additional service is a QoS and the event type 412 is the "status of a link layer has changed (424)" and upon receipt of the event trigger 400 where the QoS support information on the link layer is included in the event attribute (418), the signaling control means 202 can generate a RESERVE message having the status of the link layer, i.e., a Qspec considering the possibility of acquisition of a resource.

Figure 3:
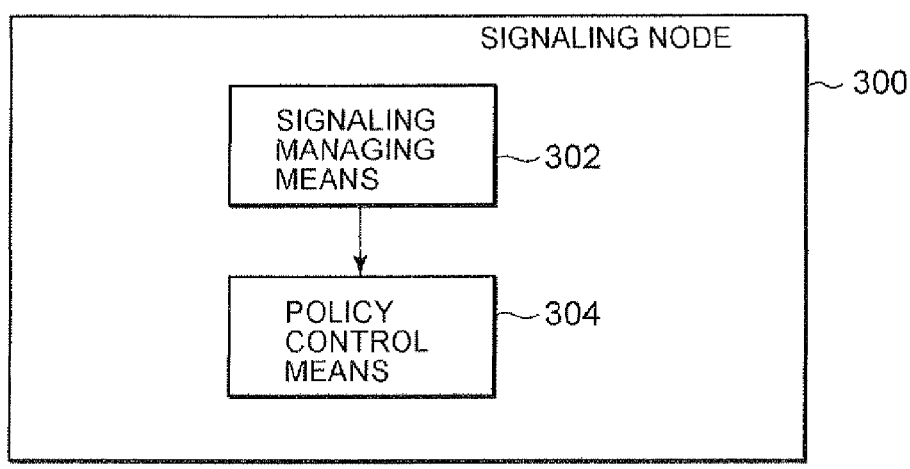
FIG. 3 is a block diagram showing a configuration of a signaling node according to the first embodiment of the present invention.

Furthermore, referring to FIG. 3, a description will be given hereinbelow of a function of a node corresponding to each additional service signaling (which will hereinafter be referred to as a signaling node) in a network which receives an additional service signaling message generated by the signaling control means 202 of the MN 100. The function of a signaling node 300 shown in FIG. 3 is provided in all the QNEs 108, 112, 120, 122 and 132 in FIG. 1. Moreover, the MN 100, the HA 116 and the CN 124 are also capable of having a QNE function and, in this case, let it be assumed that these nodes also have the QNE function.

FIG. 3 is a block diagram showing a configuration of a signaling node according to the first embodiment of the present invention. Although in FIG. 3 the respective functions of the signaling node 300 are shown in the form of blocks, these functions are realizable with hardware and/or software. In particular, the principal processing (processing in the respective steps mentioned later with reference to FIGS. 5 and 6) according to the present invention are executable with a computer program. This signaling node 300 corresponds to a QNE in the case of offering a QoS using the NSIS.

The signaling node 300 shown in FIG. 3 includes a signaling managing means 302 and a policy control means 304.

The signaling managing means 302 receives the additional service signaling message generated by the signaling control means 202 of the aforesaid MN 100 and carries out the processing on this signaling message. In this processing, in addition to the conventional processing in the case of the reception of the additional service signaling message, the MIE contained in the signaling message is stored and an operation is conducted in accordance with a different information (for example, CI) added in the present invention. For example, in a case in which this signaling message is an extension of a RESERVE message in an NSIS QoS message, simultaneously with the storage of a session identifier or a flow identifier as a state like a conventional technique, the MIE is stored, thus making a resource reservation requested therefor. Moreover, if a resource reservation exists with respect to the same session identifier, an MIE comparison is further made in addition to a conventional comparison of a flow identifier or SII (Source Identification Information). In this case, if the received signaling message is a RESERVE message for establishing a QoS oath for an optimized path and this signaling node 300 (i.e., QNE) is a crossover node (CRN) between a QoS path for a triangle path and a QoS path for an optimized path to be newly established, the processing on a triangle path can be conducted on the basis of the CI.

Moreover, it is also appropriate that, as shown in FIG. 3, the signaling node 300 has a policy control means 304. It is also appropriate that the signaling managing means 302 interchanges information with respect to the policy control means 304 in a case in which a CI is not included in the received signaling message or when different control info nation is needed although the CI is included therein.

The policy control means 304 is a means for providing a processing method to be conducted when the signaling managing means 302 carries out the processing on an additional service path. This policy control means 304 can store, for example, information similar to that in the aforesaid policy determining means 204 of the MN 100. That is, for example, in the case of offering an QoS using the NSIS in a communication using the mobile IP, when a QoS path for an optimized path is established between the MN 100 and the CN 124 in a state where a QoS path for a triangle path exists between the MN 100 and the CB 124, the policy control means 304 has information indicating how to handle a triangle path QoS path established in advance (for example, information indicating that 30% of the required. QoS resource is allocated to the triangle path side while 70% of the required QoS resource is allocated to the optimized path side for making a resource reservation) in a state where a system in the MN 100 can recognize it. For example, this information can be installed in a signaling node in advance. Moreover, this policy control means 304 is not placed in the signaling node 300 as shown in FIG. 3, but it is also acceptable that, for example, the policy control means 304 is put in a policy server or the like, an additional service provider possesses, so that a communication with this policy server is conducted when the aforesaid signaling managing means 302 receives a signaling message. For example, the COPS (Common Open Policy Server) disclosed in the above-mentioned Non-Patent Document 5 is considered as this policy server.

As described above, the MN 100 in FIG. 1 is configured as shown in FIG. 2 and the function of the signaling node 300 shown in FIG. 3 is provided in the QNEs 108, 112, 120, 122 and 132 in FIG. 1, so a node in a network can flexibly carry out the processing according to the type of each path which offers an additional service.

Figure 5:
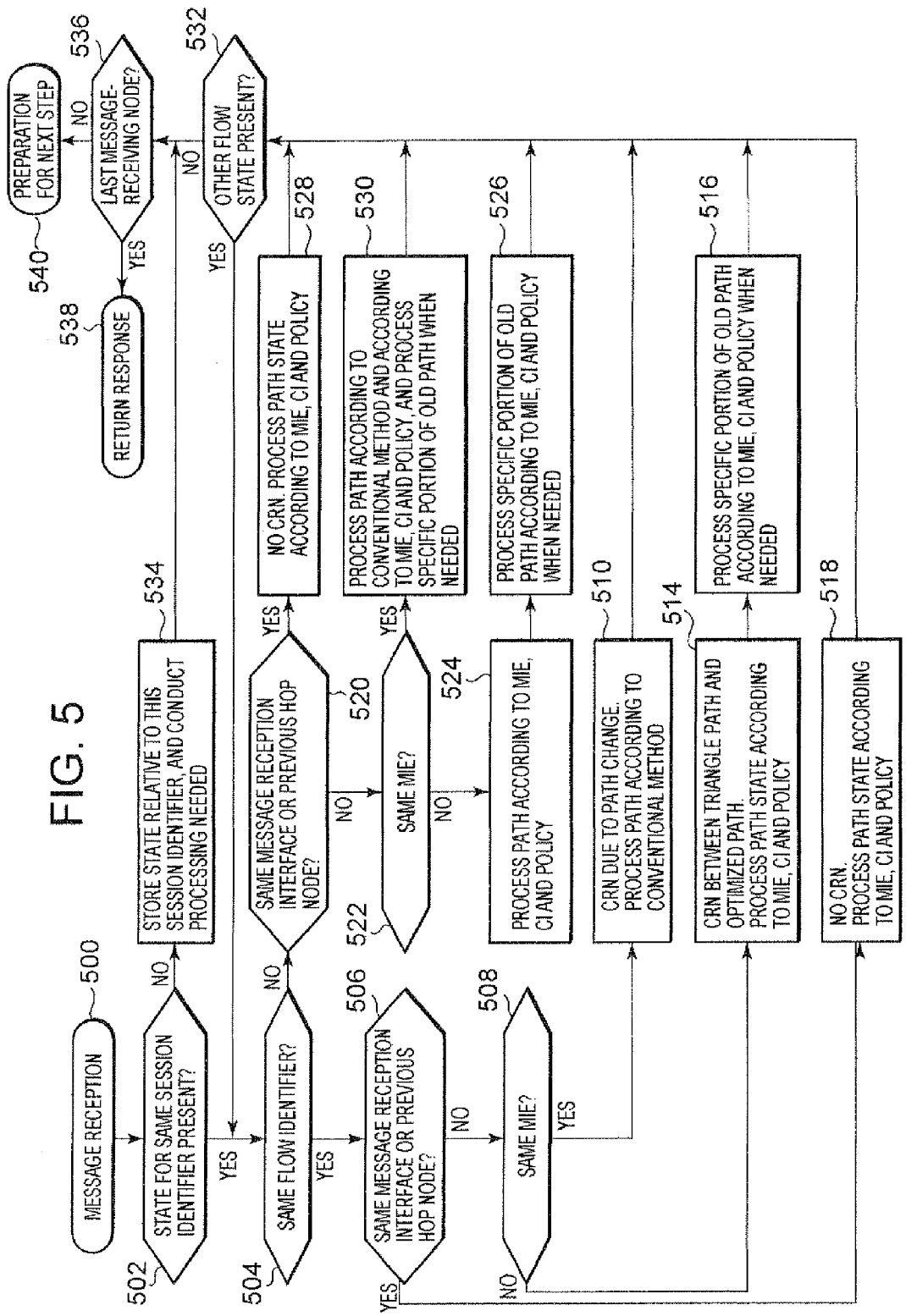
FIG. 5 is a flow chart showing one example as to how a QNE which has received a signaling message processes a state in the interior of an QNE in accordance with this signaling message and the contents of a state stored, in the first embodiment of the present invention.
Figure 6:
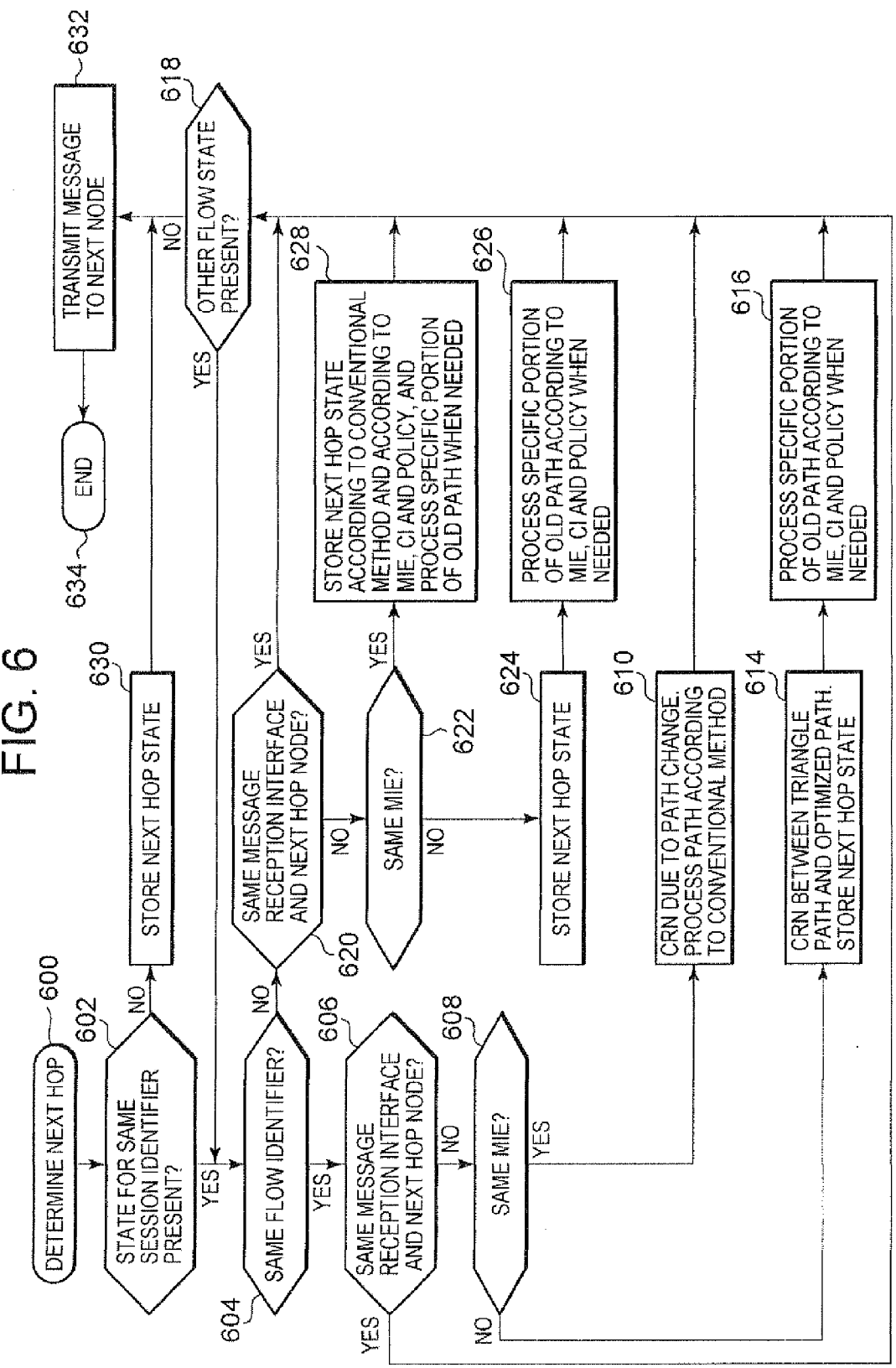
FIG. 6 is a flow chart showing one example as to how a QNE which transmits a signaling message processes a state in the interior of an QNE in accordance with a signaling message received and the contents of a state stored, in the first embodiment of the present invention.

Furthermore, referring to FIGS. 5 and 6, a description will be given hereinbelow of one example of processing in a case in which, in the case of providing a QoS using the NSIS to a communication using the mobile IPv6, a same flow identifier is used particularly for a QoS path for a triangle path and a QoS path for an optimized path. FIGS. 5 and 6 show one example of the processing to be conducted by the signaling managing means 302 of the signaling node 300, and FIG. 5 is an illustration of one example of the processing at the reception of a signaling message while FIG. 6 is an illustration of one example of the processing at the transmission of a signaling message.

The description of the following examples will be given assuming that data packet identification information (filter) for identifying a data packet to which each QNE gives a QoS is contained in a portion of an NSIS signaling message, for example, in a RESERVE message.

As shown in FIG. 1, when the MN 100 has moved under a new subnet (in this case, a subnet 102) and has acquired a new CoA, the MN 100 can make a communication using a triangle path (path 180) with respect to the CN 124 by carrying out BU on the HA 116. A this time, the event trigger 400 to be sent from the triangle path setting means 201a of the MN 100 to the signaling control means 202 contains "address registration processing completion (420)" as the event type 412 and "triangle path (428)" as the path type 414. The signaling control means 202 creates an MIE on the basis of the information contained in the aforesaid event trigger 400 and generates a RESERVE message including this MIE. In this case, the flow identifier contains information where a source address is set as the CoA of the MN 100 and a destination address is set as the IP address of the CN 124. It is also acceptable that the MIE is included in the flow identifier.

According to the specification (Non-Patent Document 2) of the mobile IPv6, different header information on a data packet passing through a triangle path are respectively taken for a section between the MN 100 and the HA 116 and a section between the HA 116 and the CN 124. Accordingly, it is necessary that different data packet information (filter) to be transmitted with RESERVE messages and stored in each QNE are respectively taken for the section between the MN 100 and the HA 116 and the section between the HA 116 and the CN 124. For realizing this, when the MN 100 generates a RESERVE message, it is also appropriate that a filter for each of the section between the MN 100 and the HA 116 and the section between the HA 116 and the CN 124 is explicitly put in the RESERVE message. As one example of a method of indicating an adaptable scope of a filter, it is considered to employ the Scoping Object proposed in the Non-Patent Document 4.

Although the RESERVE message generated by the signaling control means 202 of the MN 100 is transmitted from the MN 100 toward the CN 124, it is transmitted in a state encapsulated by a means in the mobile IP. That is, this RESERVE message is transmitted through a triangle path (path 180) toward the CN 124. At this time, let it be assumed that another NSIS state related to a same session identifier, i.e., a resource reservation or the like, does not exist in any QNE on this path 180.

Upon receipt of this signaling message (RESERVE message), the QNE 108 carries out the processing on this signaling message through the use of the signaling managing means 302. The following description will be given of, in a case in which another NSIS state related to the same session identifier does not exist, the processing to be conducted when the QNE 108 has received a signaling message and the processing to be conducted when it transmits a signaling message.

As shown in FIG. 5, upon receipt of the RESERVE message (step 500), the signaling managing means 302 of the QNE 108 first checks whether or not a state (resource reservation) for the same session identifier already exist (step 502). At present, the state related to the same session identifier does not exist and, hence, the state indicated in the received RESERVE message is stored (step 534). In this case, the MIE included in the RESERVE message is also stored together with the state stored with the conventional NSIS QoS. Following this, a decision is made as to whether or not this QNE 108 is the final QNE for the processing of the RESERVE message (step 536). If it is the final QNE (that is, in this case, the CN 124), a RESPONSE message is generated with respect to this RESERVE message and this RESPONSE message is transmitted to the source (i.e., the MN 100) of the RESERVE message (step 538). Incidentally, since the QNE 108 described here is not the final QNE, the processing advances to a transmission procedure for the transmission of the RESERVE message (step 540).

As shown in FIG. 6, the transmission procedure determines the QNE (in this case, QNE 112) of the next hop which receives the RESERVE message (step 600). Subsequently, a confirmation is made that no state for the same session identifier exists (step 602), and the information on the next QNE (that is, the information on the QNE 112) which processes the RESERVE information is stored (step 630). Moreover, the RESERVE message is transmitted to the QNE 112 (step 632). The processing for specifying the QNE of the next hop in the step 600 can also be conducted by the reply from the next NSIS node which has received the RESERVE message, as disclosed in the Non-Patent Document 4.

Through the above-described processing, the QNE 108 can store the MIE together with the state corresponding to the RESERVE message and transfer the RESERVE message to the QNE 112 if the next hop. Moreover, the similar processing is conducted in the QNE 112 of the next hop and further the HA 116, the QNE 120 and the QNE 122 until the arrival at the CN 124, thus establishing a QoS path on a triangle path (path 180). Still moreover, in the CN 124 which has received this RESERVE message, the transmission processing on a RESPONSE message is conducted with respect to this RESERVE message in the step 538 as mentioned above.

Furthermore, a description will be given hereinbelow of a case in which the MN 100 carries out the BU processing with respect to the CN 124 for enabling a communication using an optimized path with respect to the CN 124. At this time, the event trigger 400 to be sent from the optimized path setting means 201b of the MN 100 to the signaling control means 202 contains "address registration processing completion (420)" as the event type 412 and "optimized path (430)" as the path type 414. The signaling control means 202 creates an MIE on the basis of the information included in the aforesaid event trigger 400 and produces a RESERVE message including this MIE. In this case, for the MIE, let it be assumed that, for example, "01" is used as a numeric value indicative of the optimized path. Moreover, the flow identifier in this case includes the information where a source address is set as the CoA of the MN 100 and a destination address is set as the IP address of the CN 124. That is, this flow identifier to be used is the same as the flow identifier at the establishment of the aforesaid triangle path (path 180) QoS path. The RESERVE message for the optimized path, generated by the signaling control means 202, is transmitted from the MN 100 through the optimized path (in this case, the path 182) toward the CN 124.

The signaling managing means 302 of each of the QNEs (QNE 108, QNE 120, QNE 122) on the path 182, which has received the RESERVE message for the optimized path, also carries out the processing on this RESERVE message according to the flow charts shown in FIGS. 5 and 6.

First, a description will be given hereinbelow of the processing in the QNE 108 which is one of the QNEs on the path 182. This QNE 108 constitutes a branch point between the path 180 where a triangle path QoS path has been established according to the above-mentioned operation and the path 182 where an optimized path QoS path will newly be established from now on. In this example, since the flow identifier of the path 180 is the same as the flow identifier of the path 182, there is a need to make a discrimination from a path change occurring due to some change on the network side (for example, in a case in which, due to failure of one router on the established QoS path, an alternative path is used and the QoS path is updated on this alternative path). That is, in this case, although the QoS path established on the path 180 and a QoS path which will be established on the path 182 from now on have the same flow identifiers, the coexistence processing is conducted such that a QoS path on the path 180 is used as a triangle path QoS path and a QoS path on the path 182 is used as an optimized path QoS path.

As shown in FIG. 5, upon receipt of this RESERVE message (step 500) the signaling managing means 302 of the QNE 108 first checks whether or not a state (resource reservation) for a same session already exists (step 502). In this case, since the state on the above-mentioned triangle path QoS path exists, the signaling managing means 302 subsequently checks whether or not the flow identifier is the same with respect to this state (step 504). In this case, since the same flow identifier is put to use, the signaling managing means 302 then refers to the state of the triangle path QoS path to check whether or not the former node (node of the previous hop) which has received the RESERVE message is equal to one stored and further examine whether or not the interface which has received the RESERVE message is equal to one stored (step 506). In this case, since the state of the node of the previous hop stored is equal to the path 182 (that is, the node of the previous hop is the same as the MN 100), on the basis of the contents of the MIE or the contents of the CI, the signaling managing means 302 then makes a decision as to how to process the state of the original path (state of the path 180), thus carrying out appropriate processing (step 518). The QNE 108 conducts the state management with, for example, two paths 180 and 182 being handled as independent paths. For example, it is also appropriate that the QNE 108 carries out the processing so that 30% of the required resource is allocated to the triangle path QoS path while 70% of the required resource is allocated to the optimized path. Moreover, it is also appropriate that these two paths 180 and 182 are combined with each other so that, even if a data packet passing through any one of these paths 180 and 182 comes, the same resource is usable. Still moreover, it is also acceptable that, for the processing decision in the step 518, the processing method is determined on the basis of information offered from the policy control means 304.

Following this, a check is made as to whether or not a state for another flow exists with respect to this session identifier (step 532). If the state exists, the operational flow returns to the step 504 so as to carry out the same processing on the state of another flow (flow state). However, in this case, since no other state exists, a decision is then made as to whether or not this QNE 108 is the final QNE which is to process the RESERVE message (step 536). Since the final destination of the RESERVE message is the CN 124, that is, since the QNE 108 is not the final QNE, the QNE 108 subsequently goes to a procedure for transmitting the RESERVE message (step 540).

As shown in FIG. 6, in the transmission procedure, a QNE (in this case, the QNE 120) of the next hop is determined which receives the RESERVE message (step 600). Subsequently, a conformation is made that a state for the same session identifier exists (step 602), and a confirmation is made that the flow identifier is in the like situation (step 604). Then, a confirmation is made whether or not a QNE or interface next to the destination of this RESERVE message is identical to that stored in the state relative to the same flow identifier already existing (step 606). In this case, the next hop of the triangle path QoS path is the QNE 112 while the next hop of the current RESERVE message is the QNE 120 and, since the message destination is different from that stored, a check is made as to whether or not the contents of the MIE are identical to those stored (step 608). In this case, the contents of the MIE respectively indicate the triangle path and the optimized path and, hence, a decision is made that this QNE 108 is a branch point between the optimized path and the triangle path, so the information on a QNE of the next hop (i.e., information on the QNE 120) is stored (step 614).

Moreover, when needed, it is also appropriate to carry out the processing on a specific zone (the path from the QNE 108 to the HA 116) of the path 180 (step 616). For example, this processing signifies the processing such as the transmission of a message having the contents on the reduction of the reserved resource by 30% of the specific zone of the path 180. With respect to this processing, it is also acceptable to referring to the information offered from the policy control means 304. Following this, with respect to the session identifier, a check is made as to whether or not a state for the other flows exists (step 618). If this state exists, the operational flow returns to the step 604 for carrying out the similar processing on other flow states. In this case, since no further state exists, the RESERVE message is transmitted to a node (QNE 120) of the next hop (step 632).

Although the description has been given above of the case in which two MIEs differ in content from each other, in a case in which the contents of the MIEs are same, the QNE 108 makes a decision that it stems from a path change due to a variation of the network side and carries out the processing specified in the conventional NSIS (step 610).

Furthermore, a description will be given hereinbelow of the processing in the QNE 120 in the case of the receipt of the RESERVE message transmitted from the QNE 108 through the above-mentioned processing. This QNE 120 constitutes a crossing point between the path 180 where a triangle path QoS path has been established through the above-mentioned operation and the path 182 which will be established newly from now on. In this example, since the flow identifier of the path 180 and the flow identifier of the path 182 are identical to each other, as well as the case of the above-mentioned QNE 108, there is a need to make a discrimination from a path change occurring due to some change on the network side (for example, in a case in which, due to failure of one router on the established QoS path, an alternative path is used and the QoS path is updated on this alternative path).

As shown in FIG. 5, upon receipt of this RESERVE message (step 500), the signaling managing means 302 of the QNE 120 first checks whether or not a state (resource reservation) for a same session already exists (step 502). In this case, since the state on the above-mentioned triangle path (path 180) QoS path exists, the signaling managing means 302 subsequently checks whether or not the flow identifier is the same with respect to this state (step 504). In this case, since the same flow identifier is put to use, the signaling managing means 302 then refers to the state of the triangle path QoS path to check whether or not the former node (node of the previous hop) which has received the RESERVE message is equal to one stored and further examine whether or not the interface which has received the RESERVE message is equal to one stored (step 506). In this case, since the state of the node of the previous hop stored is different from the path 182 (that is, the node of the previous hop on the path 180 is the HA 116 and the node of the previous hop on the path 182 is the QNE 108), a check is then made as to whether the MIE in the RESERVE message is identical with that stored (step 508). In this case, since the MIE is not identical therewith, the QNE 120 makes a decision that it is a CRN on the triangle path QoS path and the optimized path QoS path and, on the basis of the contents of the MIE, makes a decision as to how to first process the state (state related to the path 180) of the original path, thus carrying out appropriate processing (step 514). This processing is similar to that in the step 518.

Moreover, when needed, it is also appropriate to carry out the processing on a specific zone (for example, the path from the HA 116 to the QNE 120) of the original path (path 180) (step 516). For example, this processing signifies the processing such as the transmission of a message having the contents on the reduction of the reserved resource by 30% to this specific zone of the path 180. Still moreover, for the implementation of these processing (step 514 and step 516), it is also appropriate to referring to the information given from the policy control means 304. Incidentally, although the description has been given above of the case in which two MIEs differ in content from each other, in a case in which the contents of the MIEs are same as each other, the QNE 108 makes a decision that it stems from a path change due to a variation of the network side and carries out the processing specified in the conventional NSIS (step 510).

Following this, a check is made as to whether or not a state for another flow exists with respect to this session identifier (step 532). If the state exists, the operational flow returns to the step 504, and similar processing is conducted with respect to other flow states. In this case, since no further state exists, a decision is made as to whether or not this QNE 120 is the final QNE which processes the RESERVE message (step 536). Since the final destination of the RESERVE message is the CN 124, that is, because the QNE 120 is not the final QNE, the QNE 120 advances to the procedure for message transmission (step 540).

As shown in FIG. 6, the transmission procedure determines the QNE (in this case, QNE 112) of the next hop which receives the RESERVE message (step 600). Subsequently, a confirmation is made that a state for the same session identifier exists (step 602), and a confirmation is made that the flow identifiers are also the same (step 604). Following this, a confirmation is made whether or not a QNE or interface next to the destination of this RESERVE message is identical to that stored in the state for the same flow identifier already existing (step 606). In this case, since the QNEs of the next hop relative to the two paths 180 and 182 are the same (QNE 122), a check is made as to whether or not a state for the other flow exists with respect to the session identifier (step 618). If the state exists, the operational flow returns to the step 604 so as to carry out similar processing on the other flow states. However, in this case, since no further state exists, the RESERVE message is transmitted to the node (QNE 122) of the next hop (step 632).

Upon receipt of the RESERVE message from the QNE 120, the QNE 122 carries out the same reception procedure as that in the QNE 108 which has received the aforesaid RESERVE message for the optimized path. That is, the QNE 122 conducts the processing in the step 502, the step 504, the step 506, the step 518, the step 532, the step 536 and the step 540 in FIG. 5. The transmission procedure in the QNE 122 is the same as that in the aforesaid QNE 120. That is, the QNE 122 carries out the processing in the step 600, the step 602, the step 604, the step 606, the step 618 and the step 632 in FIG. 6.

Although not shown in the system configuration of FIG. 1, there is a possibility that a QNE exists which is on both the triangle path QoS path and the optimized path QoS path, wherein the nodes of the previous hop on the triangle path QoS path and the optimized path QoS path differ from each other and the nodes of the next hop on the triangle path QoS path and the optimized path QoS path differ from each other. Such a QNE exists at a crossing point between the triangle path QoS path and the optimized path QoS path, and with respect to the QNE existing at the crossing point where the states of both the RESERVE message reception side QNE and the destination QNE differ from the state stored, in the reception procedure shown in FIG. 5, the operation advances through the step 506 and the step 508 to the processing in the step 514, and in the transmission procedure shown in FIG. 6, the operation proceeds through the step 606 and the step 608 to the processing in the step 614. Therefore, it is also appropriate that, in the step 516 shown in FIG. 5 and in the step 616 shown in FIG. 6, a further decision is made as to whether or not this QNE is at a crossing point and appropriate processing is conducted on the basis of a result of the decision.

Moreover, since the CN 124 is the last node which processes the RESERVE message, when needed, with respect to this RESERVE message, the signaling managing means 302 a produces a RESPONSE message and transmits it to the MN 100 which is the transmission source of the RESERVE message.

Furthermore, a description will be given hereinbelow of a case of, when the MN 100 has moved to a different subnet subordinate (for example, subnet 126) to acquire a new CoA, enabling a communication using a triangle path (path 184) with respect to the CN 124 in a manner such that the MN 100 again carries out a BU with respect to the HA 116. In this case, the triangle path setting means 201a of the MN 100 sends an event trigger 400 to the signaling control means 202. This event trigger 400 contains "address registration processing completion (420)" as an event type 412 and "triangle path (428)" as a path type 414. The signaling control means 202 creates an MIE on the basis of the information contained in the aforesaid event trigger 400 and generates a RESERVE message including this MIE. In this case, for the MIE, let it be assumed that, for example, "00" is again used as a numeric value indicative of a triangle path. Moreover, since the new CoA of the MN 100 becomes a transmission source, the flow identifier in this case becomes different from the QoS path for a triangle path (path 180) or an optimized path (path 182) established from a subnet (subnet 102) before the movement. Although a RESERVE message for a triangle path (path 184), produced by the signaling control means 202, is transmitted from the MN 100 toward the CN 124, the mobile IP means encapsulate and transmits it so as to pass through the HA 116. That is, this RESERVE message is transmitted from the MN 100 through the triangle path (path 184) toward the CN 124.

Upon receipt of this RESERVE message, in the QNE 132, the signaling managing means 302 carries out the processing on this RESERVE message. In this case, since a state for the same session identifier does not exist in the QNE 132, the processing is conducted as well as the QNE 108 in a case in which the MN 100 establishes a triangle path (path 180) QoS path from the subnet 102.

Following this, upon receipt of this RESERVE message from the QNE 132, the QNE 112 is a node at which this new triangle path (path 184) QoS path starts to intersect the old triangle path (path 180) QoS path. Referring again to FIGS. 5 and 6, a description will be given hereinbelow of the processing in the QNE 112 in this case.

As shown in FIG. 5, upon receipt of the RESERVE message from the QNE 132 (step 500), the signaling managing means 302 of the QNE 112 first checks whether or not a state (resource reservation) for the same session already exists (step 502). In this case, since the aforesaid old triangle path (path 180) QoS state exists, the signaling managing means 302 then checks the flow identifier is the same with respect to this state (step 504). In this case, along with the movement of the MN 100, a different flow identifier is put to use. Moreover, the signaling managing means 302 refers to the state of the old triangle path (path 180) QoS path to check whether or not the former node (node of previous hop) which has received the RESERVE message is the same as that stored and check whether or not the interface which has received the RESERVE message is the same as that stored (step 520). In this case, since the state of the node of the previous hop stored is different from that of the path 184 (that is, the node of the previous hop of the path 180 is the QNE 108 while the node of the previous hop of the path 184 is the QNE 132), a check is then made as to whether or not the MIE in the RESERVE message is the same as that stored (step 522). In this case, since the state stored in the old triangle path (path 180) QoS state, it is seen that the MIEs are the same. Accordingly, a decision is made that this QNE 112 is a CRN stemming from the handover, and the state is updated according to a conventional method (for example, the method disclosed in the Non-Patent Document 4) and, when needed, the processing can be conducted with respect to a specified zone (for example, the path from the QNE 112 to the AP 104) of the former path (path 180) (step 530). Moreover, in this case, in addition to the processing method in the CRN stemming from the handover according to the conventional NSIS, it is also acceptable to carry out processing in consideration of the fact of a triangle path. For example, in the aforesaid processing in the step 516 for the QNE 120 in the case of the establishment of the optimized path (path 182), if the reservation resource is reduced to 30%, it is possible to conduct the processing for putting it back to 100%, or other processing. Incidentally, for such processing, it is also appropriate to refer to the information offered from the policy control means 304. Following this, the signaling managing means 302 of the QNE 112 confirms whether or not another flow state exists (step 532). if it exists, the operational flow returns to the step 504 so as to carry out similar processing on the other flow state. In this case, since there is no other state, a decision is made as to whether or not this QNE 112 is the last QNE which processes the RESERVE message (step 536). Since the last destination of the RESERVE message is the CN 124, that is, because the QNE 112 is not the last QNE, the QNE 112 is toward the procedure for the transmission of a message (step 540).

As shown in FIG. 6, the transmission procedure determines the QNE (in this case, HA 116) of the next hop which receives the RESERVE message (step 600). Subsequently, a confirmation is made that a state for the same session identifier exists (step 602), and a confirmation is made that the flow identifiers are different from each other (step 604). Subsequently, a confirmation is made as to whether or not a QNE or interface next to the destination of this RESERVE message is identical to that stored (step 620). In this case, since the QNEs of the next hops of the two paths 180 and 184 are the same (HA 116), a check is then made as to whether or not a state for another flow exists with respect to the session identifier (step 618). If it exists, the operational flow returns to the step 604 so as to carry out similar processing on the other flow state. However, in this case, because of no further state, the RESERVE message is transmitted to the node (HA 116) of the next hop (step 632).

In this connection, in a case in which the CRN between the path 180 and the path 184 is not the QNE 112 but it is for example, the QNE 108, the state of the old optimized path (path 182) QoS path also exists in the QNE 108. In this case, after the difference in MIE has been confirmed in the step 522, the state of the old optimized path (path 182) QoS path is processed through the use of the contents of the CI or the information provided from the policy control means 304 in the step 524 or the step 526. As the processing in this step 524 or 526, for example, considered is the processing for reducing the resource of the old optimized path (path 182) QoS path to 30% or the processing for releasing the old optimized path (path 182) QoS path itself. Moreover, it is also considered that, for example, for making a terminal node (i.e., the CN 124) carry out the processing on the old optimized path (path 182) QoS path, no processing takes place at this stage. Still moreover, it is also appropriate that, at this time, the signaling managing means 302 adds, to the RESERVE message, the information whereby the processing conducted with respect to each path QoS state is notified to other QNEs.

In addition, the RESERVE message for this new triangle path (path 184) is further transmitted from the QNE 112 to the HA 116, the QNE 120, the QNE 122 and the CN 124. In the HA 116, the QNE 120, the QNE 122 and the CN 124, upon receipt of this RESERVE message, the signaling managing means 302 makes a decision that the message destination interface or destination node is the same in the step 420 with respect to the state of the old triangle path (path 180) QoS path and, in the step 528, conducts the processing on the basis of the contents of the CI or the information provided from the policy control means 304. As the processing in the step 528, for example, considered is the processing for replacing the state of the old triangle path (path 180) QoS path with the state of a new triangle path (path 184) QoS path.

Still additionally, in the QNE 120, the QNE 122 and the CN 124, a state for the old optimized path (path 182) also exists. In the QNE 120, upon receipt of the RESERVE message for this new triangle path (path 184), in the step 520, a decision is made that the destination interface or destination node for the old optimized path (path 182) stored is different from that for the current path 184 and, in the step 522, a decision is made that the ME is different therefrom. Moreover, in the step 524, the state of the old optimized path (path 182) QoS path is processed through the use of the contents of the CI or the information provided from the policy control means 304. As this processing, for example, considered is the processing for reducing the resource of the old optimized path (path 182) QoS path to 30% or the processing for releasing the old optimized path (path 182) QoS path itself. Still moreover, it is also appropriate that, in the step 526, through the use of the contents of the CI or the information provided from the policy control means 304, the processing is conducted with respect to a specific zone (for example, the path from the QNE 120 to the AR 106) forming a portion of the old optimized path (path 182) QoS path. As this processing, for example, considered is the processing for creating a message for reducing the resource of the old optimized path (path 182) QoS path to 30% or releasing the old optimized path (path 182) QoS path itself and for then transmitting it. Yet moreover, it is also considered that, for example, for making a terminal node (i.e., the CN 124) carry out the processing on the old optimized path (path 182) QoS path, no processing takes place at this stage. In addition, it is also appropriate that, at this time, the signaling managing means 302 adds, to the RESERVE message, the information whereby the processing conducted with respect to each path QoS state is notified to other QNEs.

On the other hand, the QNE 122 or the CN 124, in the step 520, makes a decision that the destination interfaces or destination nodes related to the old optimized path (path 182) stored are the same and then, in the step 528, conducts the processing on the state of the old optimized path (path 182) QoS on the basis of the contents of the CI or the information provided from the policy control means 304 according to a method similar to the above-mentioned method in the step 524. Moreover, it is also appropriate that, upon receipt of this RESERVE message, the CN 124 transmits a message for the processing on the old optimized path (path 182) QoS path through the path 182 toward the subnetwork 102 by using the contents of the CI or the information provided from the policy control means 304. As this processing, for example, considered is the processing for reducing the resource of the old optimized path (path 182) QoS path to 30% or the processing for releasing the old optimized path (path 182) QoS path itself. Through the above-mentioned processing, a new triangle path (path 184) is established.

Furthermore, also in a case in which, in the subnet 126, the MN 100 carries out the BU processing with respect to the CN 124 and, even in the case of establishing a QoS path for a new optimized path (path 186), a QoS path can be established by conducting processing similar to the above-mentioned processing in each QNE (i.e., the QNE 132, the QNE 122, the CN 124) on the path 186.

It is also appropriate that an arbitrary node in the network 170 has a function to control an additional service and functions as a proxy of the MN 100. In this case, although the MN 100 is not required to have a function for controlling an additional service, the arbitrary node acting as a proxy has a means for interchanging information needed for the control of the additional service with the proxy. For example, it is considered that the MN 100 has only the mobility detecting means 200, the triangle path setting means 201a and the optimized path setting means 201b (not having the signaling control means 202 and the policy determining means 204) while the proxy has the signaling control means 202 and the policy determining means 204. In this case, the event trigger 400 is directly sent from the triangle path setting means 201a or the optimized path setting means 201b in the MN 100 to the proxy through the network 170 or without passing through the network 170.

Furthermore, Although the above-described first embodiment relates to an example in which the same flow identifier is used for a triangle path QoS path and for an optimized path QoS path, it is also applicable to a case in which different flow identifiers are respectively used for a triangle path QoS path and for an optimized path QoS path. As one method of realizing it, it is considered that, in addition to the MIE or as a portion of the MIE, the MN 100 has a location sequence number (LSN). This LSN does not change in a state where the MN 100 is under the same subnet while it changes when the MN 100 moves from the subnet (for example, the value is incremented by one). Thus, in the step 504 shown in FIG. 5 or in the step 604 shown in FIG. 6, for making a decision as to whether or not the RESERVE message, a QNE has received, has been outputted from the MN 100 existing under the same subnet, the LSN is employable in place of the use of a flow identifier.

Although in the above-described first embodiment the MN 100 generates an MIE or an LSN and transmits a signaling message including it, it is also appropriate that the CN 124 generates an MIE or an LSN and transmits a signaling message including it. Since the CN 124 can seize the movement of the MN 100 from/into a subnet and the use of an optimized path by receiving a BU from the MN 100, the CN 124 can generate an MIE or an LSN and transmit a signaling message for establishing a QoS path for an optimized path including it.

At the transmission/reception of a packet through a triangle path, there is a possibility that the packet transmitted from the MN 100 to the CN 124 or from the CN 124 to the MN 100 twice passes through a same QNE. This state will be described with reference to FIG. 7.

Figure 7:
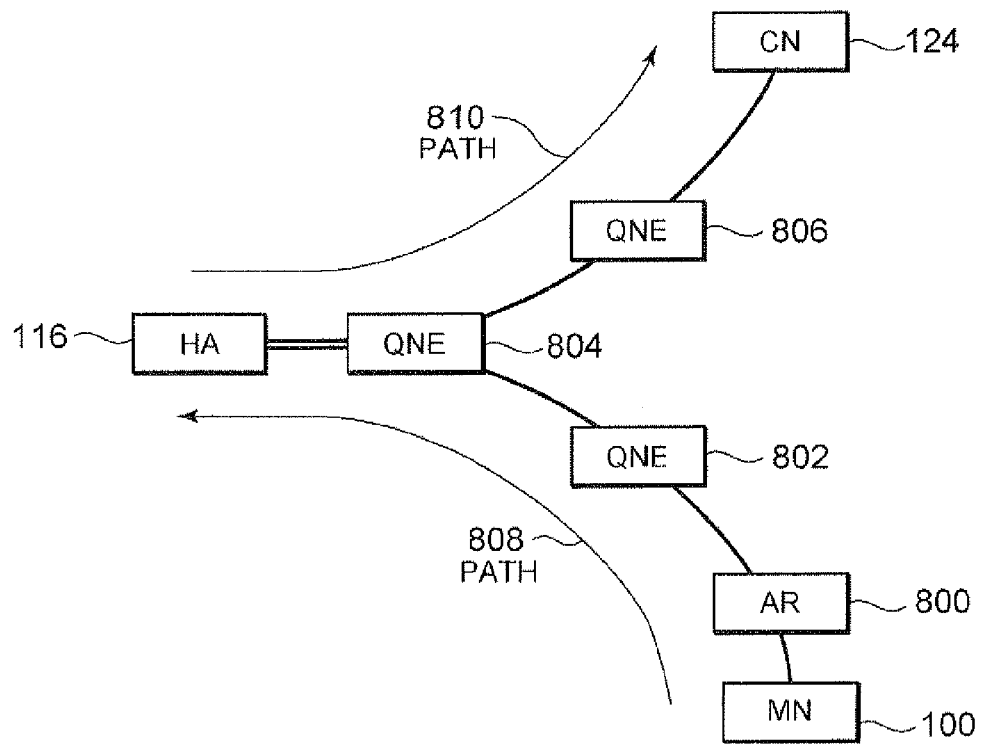
FIG. 7 is an illustrative view showing an example of a case in which, at the transmission/reception of a packet through a triangle path in a mobile IP, a packet transmitted from an MN to a CN passes through a same QNE twice, in the first embodiment of the present invention.

FIG. 7 is an illustrative view showing an example in which, for packet transmission/reception through a triangle path in the mobile IP, a packet transmitted from the MN 100 to the CN 124 twice passes through the same QNE (QNE 804 in FIG. 7). In the example of the path shown in FIG. 7, when a packet is transmitted from the MN 100 to the CN 124 through the use of a triangle path passing through the HA 116, the path (path 808) between the MN 100 and the HA 116 goes through an AR 800, a QNE 802 and a QNE 804, and the path (path 810) between the HA 116 and the CN 124 goes through a QNE 804 and a QNE 806. That is, a packet transmitted from the MN 100 is encapsulated and sent through the AR 800, the QNE 802 and the QNE 804 to the HA 116 and, after decapsulated in the HA 116, it again passes through the QNE 804 and arrives at the CN 124 through the QNE 806.

In a case in which a RESERVE message is transmitted from the MN 100 to the CN 124 in order to establish a QoS path on this path, the RESERVE message first passes through the AR 800, the QNE 802 and the QNE 804 and reaches the HA 116, so a state on a resource reservation for the path 808 is produced in the QNE 804. Moreover, the RESERVE message which has arrived at the HA 116 again passes through the QNE 804 and reaches the CS 124 through the QNE 806, while a QoS state on the path 808 (that is, state on a same session identifier) already exists in the QNE 804. In this case, if the MIE for the path 808 and the MIE for the path 810 are the same, there is a problem in that the QNE 804 cannot distinguish between the state of the path shown in FIG. 7 and a path change (in a case in which the path 808 and the path 810 are different in flow identifier from each other) stemming from movement or a path change (in a case in which the path 808 and the path 810 are different in flow identifier from each other) occurring due to some change of the network side.

Although the above-mentioned example relates to a case in which a packet is transmitted from the MN 100 to the CN 124, the same problem can also apply to a case in which a packet is transmitted from the MN 100 to the CN 124.

In order to avoid the above-mentioned problems, it is preferable that the RESERVE message explicitly indicates "path between MN-HA in a triangle path" and "path between MN-CN in a triangle path". For example, it is possible that different MIEs are respectively set for the path between the MN 100 and the HA 116 and for the path between the HA 116 and the CN 124 and further the different paths are indicated explicitly using other information different from the MIEs.

Second Embodiment

Figure 8A:
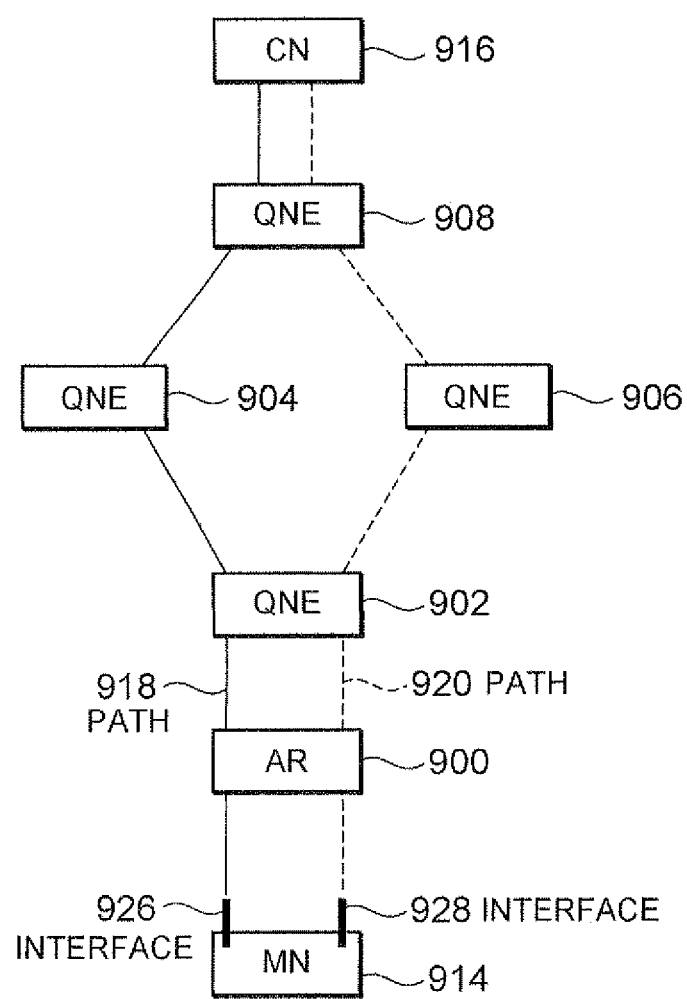
FIG. 8A is an illustration of a configuration in a case in which two interfaces of an MN are connected to a same subnet, in a second embodiment of the present invention.
Figure 8B:
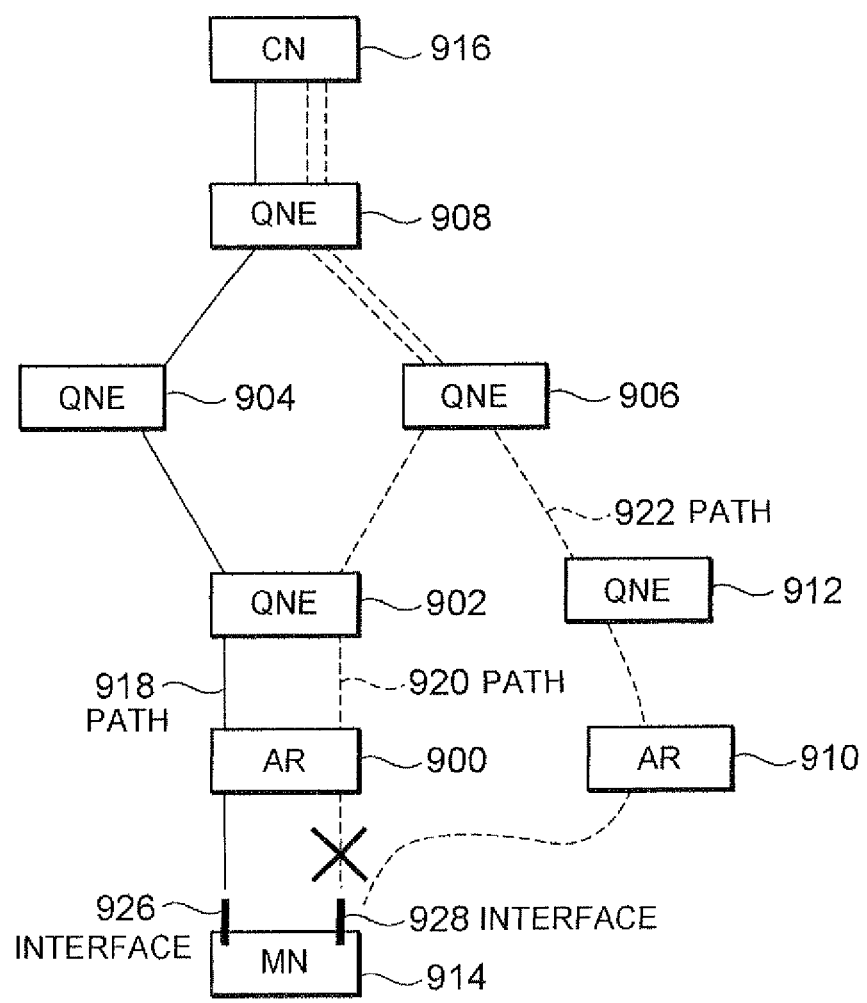
FIG. 8B is an illustration of a configuration in a case in which, in the state shown in FIG. 8A, only one interface carries out a handover to a different subnet, in the second embodiment of the present invention.
Figure 8C:
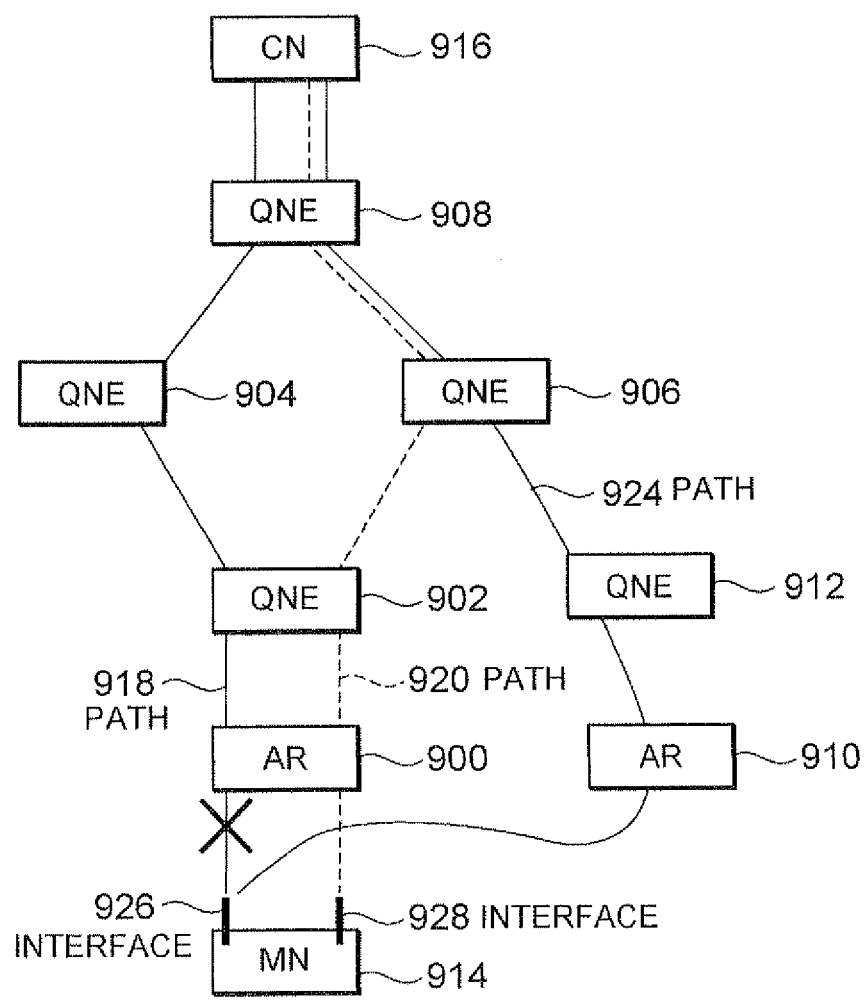
FIG. 8C is an illustration of a configuration in a case in which, in the state shown in FIG. 8A, only the other interface carries out a handover to a different subnet, in the second embodiment of the present invention.
Figure 10:
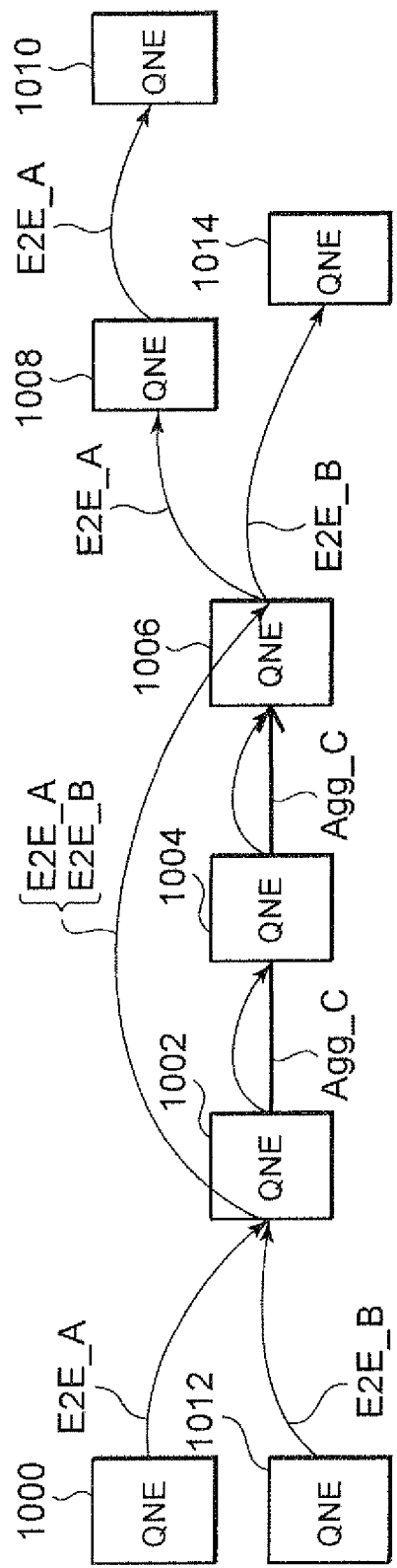
FIG. 10 is an illustrative view showing one example of an aggregation supported by an NSIS according to a conventional technique.

In addition to the identification of a triangle path and an optimized path in the mobile IP like the above-described embodiment, a path type identifier is available for, in a case in which, for example, a terminal having a plurality of communication interfaces makes a communication with a corresponding node, the identification of a communication path using each communication interface. Referring to FIGS. 8A to 8C, a description will be given hereinbelow of a second embodiment of the present invention in which an identification is made on a communication related to each communication interface of a terminal having a plurality of communication interfaces by means of path type identifier.

FIGS. 8A to 8C are illustrations of examples of configurations in which an MN makes communications with corresponding terminals through the use of two interfaces. FIG. 8A shows a configuration in a case in which two interfaces are connected to a same subnet, FIG. 8B shows a configuration in which, in the state shown in FIG. 8A, only one interface makes the handover with respect to a different subnet, and FIG. 8C shows a configuration in which, in the state shown in FIG. 8A, only the other interface (interface different from the interface in the case shown in FIG. 8B) makes the handover with respect to a different subnet.

FIG. 8A is an illustration of a configuration in which an MN 914 having two communication interfaces 926 and 928 makes data transmission/reception for one session with respect to a CN 916, which is a corresponding terminal, by using the two interfaces at the same time. Although a description will be given here of an example in which the MN 914 receives data from the CN 916, same problems, which will be mentioned later, occur even in a case in which the CN 916 receives data from the MN 914.

In FIG. 8A, both the access points (not shown) connected to the interfaces 926 and 928 of the MN 914 belong to a subnet under the same access router (AR 900), and IP addresses to be used in the subnet under the AR 900 are allocated to the interfaces 926 and 928 of the MN 914. In this case, IP addresses different from each other are allocated to the interfaces 926 and 928 of the MN 914, respectively.

A packet the MN 914 receives from the interface 926, after transmitted from the CN 916, passes through a QNE 908, a QNE 904, a QNE 902 and an AR 900 (path 918). Moreover, a packet the MN 914 receives from the interface 928 passes through the QNE 908, a QNE 906, the QNE 902 and the AR 900 (path 920).

FIG. 8B is an illustration of a configuration in which, from the state shown in FIG. 8A, the object of connection of only the interface 928 is changed to an access point existing in a subnet under a different access router (AR 910) due to movement of the MN 914 or a change of a link state of an access point. In this case, an IP address to be used in the subnet under the AR 910 is allocated to the interface 928. A packet the MN 914 receives from the interface 928, after transmitted from the CN 916, passes through the QNE 908, the QNE 906, a QNE 912 and the AR 910 (path 922).

FIG. 8C is an illustration of a configuration in which, from the state shown in FIG. 8A, the object of connection of only the interface 926 is changed to an access point existing in a subnet under a different access router (AR 910) due to movement of the MN 914 or a change of a link state of an access point. In this case, an IP address to be used in the subnet under the AR 910 is allocated to the interface 926. A packet the MN 914 receives from the interface 926, after transmitted from the CN 916, passes through the QNE 908, the QNE 906, the QNE 912 and the AR 910 (path 924).

In a case in which a QoS path is established on the path 918 and the path 920 in FIG. 8A, as mentioned above, the MN 914 receives a packet for the same session through the use of two interfaces (that is, using the two paths 918 and 920), so the session identifiers relative to the paths 918 and 920 becomes identical to each other. However, since the IP addresses to be allocated to the interfaces 926 and 928 are different from each other, the flow identifiers for the paths 918 and 920 differ from each other.

In a case in which a change from the state shown in FIG. 8A to the state shown in FIG. 8B takes place, a QoS path is established with respect to the path 922. Although the session identifier in this case is the same as the session identifier for the QoS path of the path 918 and the path 920, since the interface 928 has acquired a new IP address, the flow identifier is different from the flow identifier of the QoS path for the path 918 and further from the flow identifier of the QoS path for the path 920. In this case, since the QoS path for the path 920 is not put to use, for example, there is a need to release the QoS path for the path 920 from the QNE 906 to the AR 900 and to update the QoS path for the path 920 from the QNE 916 to the QNE 906.

In addition, in a case in which a change from the state shown in FIG. 8A to the state shown in FIG. 8C takes place, a QoS path is likewise established with respect to the path 924. Although the session identifier in this case is the same as the session identifier for the QoS path of the path 918 and the path 920, since the interface 926 has acquired a new IP address, the flow identifier is different from the flow identifier of the QoS path for the path 918 and further from the flow identifier of the QoS path for the path 920. In this case, since the QoS path for the path 918 is not put to use, for example, there is a need to release the QoS path for the path 918 from the QNE 908 to the AR 900 and to update the QoS path for the path 918 from the QNE 916 to the QNE 908.

However, in the case of a change from the state shown in FIG. 8A to the state shown in FIG. 8B and in the case of a change from the state shown in FIG. 8A to the state shown in FIG. 8C, since the flow identifier changes in a state where the session identifier is left intact, in the case of the employment of these two identifiers, with respect to the zone from the CN 916 to the QNE 906, a problem can arise in that difficulty is encountered in making a decision as to which of the QoS path for the path 918 and the QoS path for the path 920 becomes unnecessary.

For solving the above-mentioned problem, a path type identifier is usable. That is, a path identifier is allocated to a QoS path for a communication path using each interface. For example, when a QoS path is established for a communication path using the interface 926, the MN 914 transmits a path type identifier "00" in a state included in a signaling message (for example, a RESERVE message serving as an NSIS QoS message) for the QoS establishment and, when a QoS path is established for a communication path using the interface 928, transmits a path type identifier "01" in a state included therein. At this tune, as well as the above-described first embodiment, the MN 914 can put information (for example, a Qspec considering a link state of a connection-accepting side AP, a policy stored locally, or a CI based on a policy using a policy server) other than the path type identifier in the signaling message.

As in the case of the above-described first embodiment, upon receipt of a signaling message containing a path type identifier, at the time of making a resource reservation, each QNE holds, combined with a session identifier and a flow identifier, the path type identifier in a situation included in the state. Thus, for example, in a case in which a change takes place from the state shown in FIG. 8A to the state shown in FIG. 8B so that a QoS path is established with respect to the path 922, for example, in addition to the session identifiers and the flow identifiers, the QNE 906 forming a crossover point between the path 920 and the path 922 makes a comparison between the path type identifier "01" included in the QoS path establishment signaling message for the path 922 and the path type identifier "01" included in the path 920 resource reservation state stored, thereby enabling a decision that it is the QoS path establishment due to the handover of the interface (i.e., the interface 928) which is the same as the stored state. As the processing after the decision, as well as the above-described first embodiment, it is also appropriate that the processing is conducted according to a CI sent from the MN 914 or according to the policy stored locally in the QNE 906. Moreover, it is also acceptable to use the information stored in a policy server.

Furthermore, as well as the above-described first embodiment, it is also appropriate that an arbitrary node in the network has a function to control an additional service (for example, QoS) and functions as a proxy of the MN 100. In this case, although there is no need for the MN 914 to have a function to control the additional service, the arbitrary node serving as the proxy has a means to interchange the information, needed for the control of the additional service, with a proxy.

Third Embodiment

Figure 13:
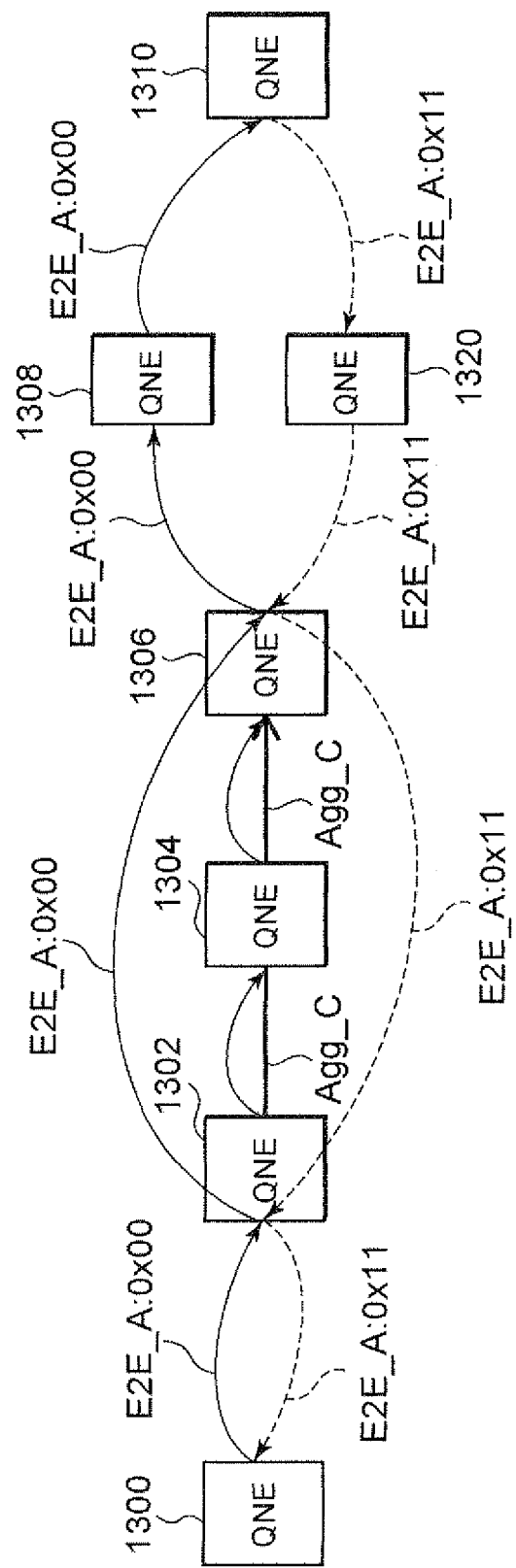
FIG. 13 is an illustrative view for explaining a state in a case in which an aggregation of a session and an association between different sessions are conducted at the same time according to a third embodiment of the present invention.

For solving the problems which can arise in a case in which the aggregation of a session and the association between different sessions are made at the same time, a path type identifier can also be used for the identification between the aggregated session and the related session. Referring to FIG. 13, a description will be given hereinbelow of a third embodiment of the present invention which is made to distinguish between an aggregated session and a related session by means of a path type identifier.

FIG. 13 is an illustrative view for explaining a situation in which an aggregation of a session and the association between different sessions are conducted at the same time. The network configuration and basic communication mode shown in FIG. 13 are the same as those shown in FIG. 12. That is, in FIG. 13, an E2E signaling message sent from a QNE 1300 through QNEs 1302, 1306 and 1308 to QNE 1310 and an E2E signaling message sent from the QNE 1310 through QNEs 1320, 1306 and 1302 to QNE 1310 to the QNE 1300 are related to each other. Moreover, the QNE 1302 and the QNE 1306 are positioned at edges of an aggregation domain internally including a QNE 1304, and the signaling message is aggregated between the QNE 1302 and the QNE 1306.

Figure 11:
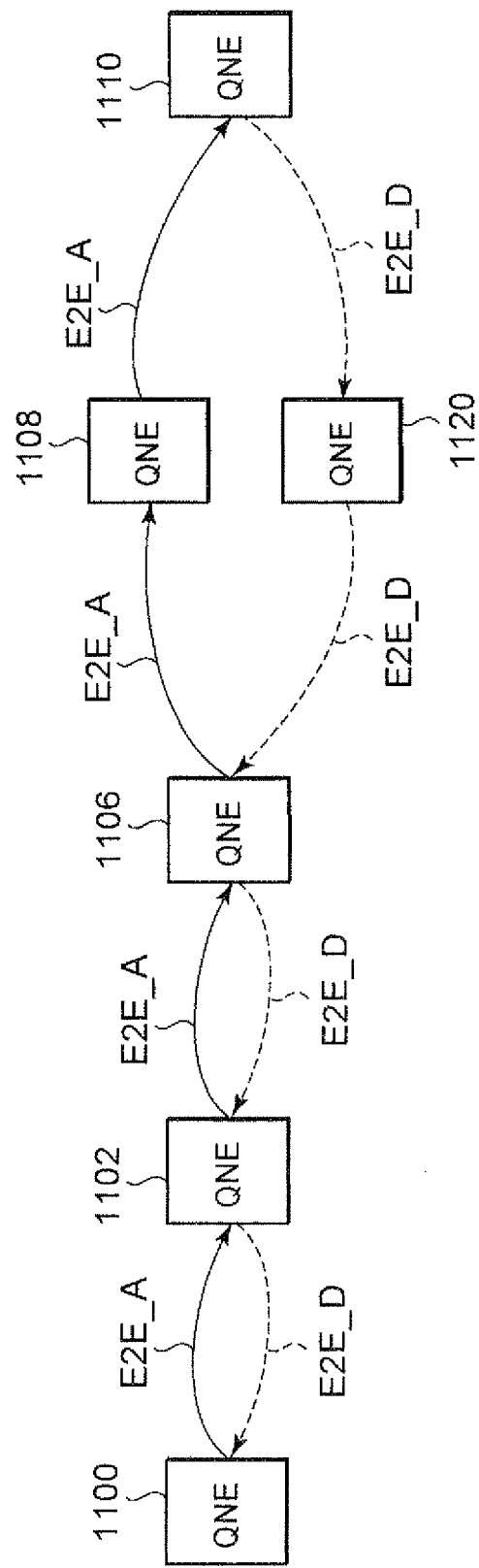
FIG. 11 is an illustrative view showing one example of an association between different sessions supported by an NSIS according to a conventional technique.
Figure 12:
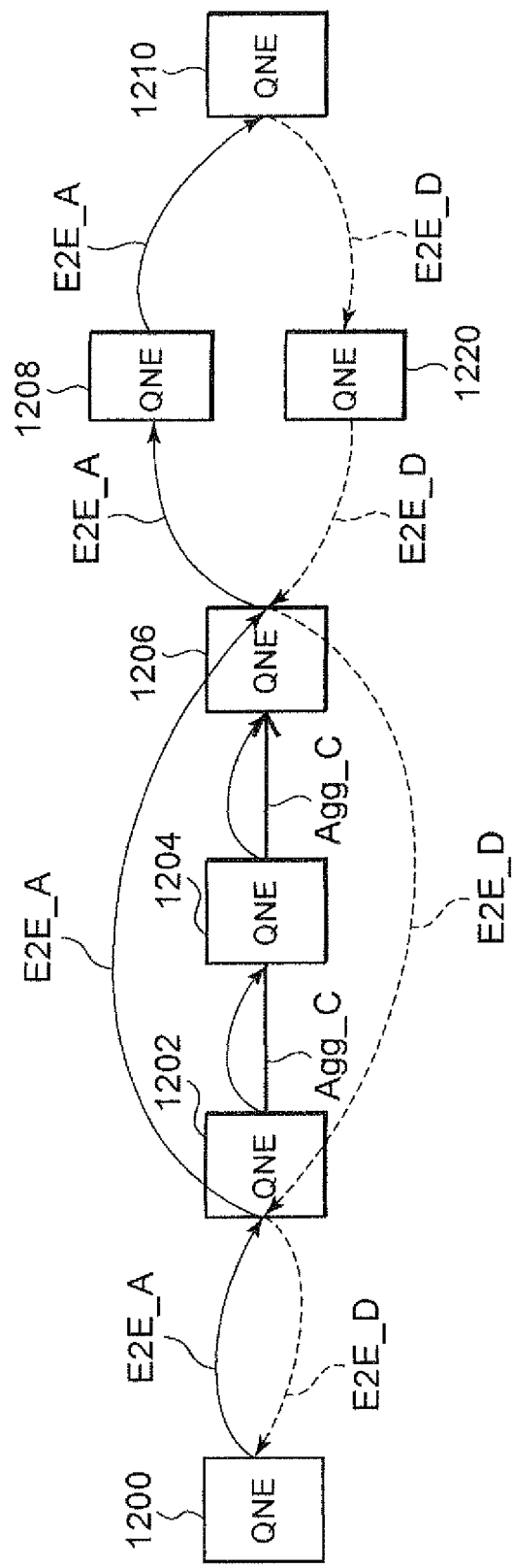
FIG. 12 is an illustrative view for explaining problems in a case in which an aggregation of a session and an association between different sessions are conducted at the same time.

As shown in FIG. 13, according to the third embodiment of the present invention, the same session identifier is used with respect to the related sessions. So far, for example, like the E2E signaling messages E2E_A and E2E_D as shown in FIGS. 11 and 12, with regard to the sessions between the same end nodes, if the directions thereof are different from each other, different session identifiers are given thereto. On the other hand, according to the third embodiment of the present invention, the two E2E signaling messages E2E_A and E2E_D, which are indicated by different session identifiers A and D in the conventional technique, are indicated by the same session identifier A as shown in FIG. 13.

As shown in FIG. 13, the employment of the same session identifier for the related sessions (for example, sessions generated between the same end nodes and different in direction (up direction (upstream)) and down direction) makes clear the association between the two E2E signaling messages E2E_A and E2E_D, which are indicated by different session identifiers (session identifiers A and D in FIGS. 11 and 12) in the conventional technique, which can eliminate the need for making the association using a BOUND_SESSION_ID parameter. This simplifies the understanding of the related signaling messages and, even in a case in which at least one of the two bidirectional E2E signaling messages between the same end nodes is aggregated in an aggregation domain, there is no need to prepare two BOUND_SESSION_ID parameters or to store two session identifiers in the BOUND_SESSION_ID parameter.

In FIG. 13, when a QNE existing on a communication path of an arbitrary session has detected some change with respect to this session, the QNE transmits a signaling message. For example, the transmission/reception of an E2E signaling message is made between the QNE 1300 and the QNE 1310, while the transmission/reception of an aggregation signaling message is made between the QNE 1302 and the QNE 1306.

In a case in which the same session identifier has been used to E2E signaling messages in different directions between the QNE 1300 and the QNE 1310, there is a need to enable the distinguishing between a signaling message transmitted in the direction from the QNE 1300 to the QNE 1310 and that transmitted in the direction from the QNE 1310 to the QNE 1300. This distinguishing becomes feasible by inserting a path type identifier in the signaling message. That is, the path type identifier (for example, 0x00) indicative of "direction from the QNE 1300 to the QNE 1310" and the path type identifier (for example, 0x11) indicative of "direction from the QNE 1310 to the QNE 1300" are determined in advance, thus providing such path type identifiers, which can mutually identify related sessions, together with a session identifier and a flow identifier.

A method of providing the same session identifier to two different sessions between the QNE 1300 and the QNE 1310 and further providing the path type identifiers for identifying the directions of the sessions can shorten the message length in comparison with a method of providing a plurality of BOUND_SESSION_ID parameters and a method of providing a plurality of session identifiers in BOUND_SESSION_ID parameters and further adding a field having information for distinguishing therebetween.

According to a conventional technique, in a case in which a BOUND_SESSION_ID parameter is used for the association between E2E signaling messages (E2E signaling messages E2E_A and E2E_D shown in FIGS. 11 and 12) which are different in direction from each other, the storage of the session identifiers themselves becomes necessary. On the other hand, according to the present invention, the same session identifiers are employed and path type identifiers are added which distinguish between directions. Since the number of bits for a session identifier is large while the number of bits for a path type identifier is reducible, it is possible to shorten the message length accordingly.

Moreover, in a manner such that the same session identifier is allocated to sessions related to each other and each of path type (direction) is identifiable by a path type identifier, the burden of the QNE 1302 or the QNE 1306 positioned at an edge of an aggregation becomes reducible. The BOUND_SESSION_ID parameters are used with respect to the two applications of the session association and the handling of the aggregation in the conventional technique, whereas the session association is made by a path type identifier according to the present invention and, hence, the application of the BOUND_SESSION_ID parameter is limited to the aggregation. Therefore, the QNE 1302 or the QNE 1306 positioned at an edge of an aggregation can conduct the processing in a manner such that the BOUND_SESSION_ID parameter and the session identifier stored therein are restricted to a session identifier used for the aggregation.

Along with the employment of the path type identifier for the association between the signaling messages in two different directions between the QNE 1300 and the QNE 1310, in an aggregation domain, a same session identifier (i.e., session identifier C) is usable as a session identifier used for an aggregation signaling message to be transmitted in the direction from the QNE 1306 to the QNE 1302 and a session identifier used for an aggregation signaling message to be transmitted in the direction from the QNE 1302 to the QNE 1306, and path type identifiers are available in order to identify these two directions. In this case, in the aggregation signaling message to be transmitted in the aggregation domain, there is a need to store the session identifier C in the BOUND_SESSION_ID parameter for the aggregation and, further, there is a need to store the information on the path type identifier indicative of the direction from the QNE 1306 to the QNE 1302 or the direction from the QNE 1302 to the QNE 1306. That is, as needed, the QNEs 1302 and 1306 positioned at edges of an aggregation domain can give the same session identifier to the related aggregation signaling messages and can identify the directions thereof through the use of the path type identifiers.

Although in the above-described first embodiment and second embodiment a RESERVE message is taken as an example of an NSIS QoS signaling message including a path type identifier, it is also acceptable that other messages (for example, various kinds of messages such as QUERY, NOTIFY, RESPONSE for NSIS QoS) contains a path type identifier. Moreover, even in the above-described third embodiment, an arbitrary NSIS QoS signaling message is available.

In addition, a combination of the above-described first to third embodiments is also acceptable. That is, although the identification on a triangle path and an optimized path becomes feasible by a path type identifier in the above-described first embodiment and the communication path using one interface of a terminal having a plurality of interfaces becomes identifiable by a path type identifier in the above-described second embodiment, it is also possible to determine a path type identifier so as to fully identify both these states. Moreover, the path type identifier described above in the third embodiment can also be used in the above-described first and/or second embodiments.

In addition to the generation of a path type identifier in a terminal, it is also considered that a path type identifier is generated in an intermediate node such as a QNE. For example, in a case in which an intermediate node transmits a packet for a termination node to a plurality of paths according to a method such as load balancing or bicasting, or in other cases, when transmitting a signaling message to each path, this intermediate node generates a path type identifier for each path and puts it in the signaling message.

Moreover, the respective functional blocks used in the above description of the embodiments of the present invention are typically realized with an LSI (Large Scale Integration) which is an integrated circuit. It is also acceptable that these blocks are individually formed as one chip, or that a portion of or all of these blocks are formed as one chip. Although an LSI is taken in this case, it is sometimes referred to as an IC (Integrated Circuit), system LSI, super LSI or ultra LSI according to the level of integration.

Still moreover, the technique for the formation of an integrated circuit is not limited to the LSI, but it is also realizable with a dedicated circuit or a general-purpose processor. After the manufacturing of an LSI, it is also acceptable to utilize an FPGA (Field Programmable Gate Array) which enables the programming or a reconfigurable processor which allows the reconfiguration of connections and setting of circuit cells in the interior of the LSI.

Yet moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

A communication method, communication message processing method and program making a computer realize these methods have an advantage in that processing based on the type of each path for offering an additional service can flexibly be conducted in a case in which a plurality of paths for offering an additional service with respect to a same session exist between terminals which mutually make communications through a network, and they are applicable to technical fields relating to a terminal made to carry out a communication and a network node made to offer an additional service and, in particular, they are applicable to a technical field in which a QoS guarantee using NSIS is given to a communication path for a mobile terminal designed to carry out a wireless communication through the use of a mobile IP protocol which is the next-generation Internet Protocol.

The invention claimed is:

1. A communication method for a mobile terminal having a plurality of interfaces configured to communicate with a corresponding terminal using a plurality of communication paths having a same session identifier, the communication method comprising:
   a detecting step of detecting that one of the plurality of interfaces performs a handover and obtain a new IP address; and
   a transmitting step of transmitting a signaling message including a path-type identifier to a communication path from the interface detected by the detecting step, the signaling message notifying the path type-identifier to all of signaling nodes on the communication path, the path-type identifier identifying the detected interface and the communication path connected to the detected interface,
   wherein said all of signaling nodes are QoS NSIS Entities.

2. The communication method according to claim 1, wherein the path-type identifier of the communication path from the interface is identical before and after the handover of the interface.

3. The communication method according to claim 1, wherein the path-type identifier is set by the mobile terminal.

4. The communication method according to claim 1, wherein the signaling message transmitted in the transmitting step includes the same session identifier to notify the same session identifier as well as the path-type identifier to said all of signaling nodes.

5. A mobile terminal configured to communicate with a corresponding terminal using a plurality of communication paths having a same session identifier, the mobile terminal comprising:
   a plurality of interfaces configured to communicate with a corresponding terminal;
   a detecting unit configured to detect that one of the plurality of the interfaces performs a handover and obtain a new IP address; and
   a transmitting unit configured to transmit a signaling message including a path-type identifier to a communication path from the interface detected by the detecting unit, the signaling message notifying the path type-identifier to all of signaling nodes on the communication path, the path-type identifier identifying the detected interface and the communication path connected to the detected interface,
   wherein said all of signaling nodes are QoS NSIS Entities.

6. The mobile terminal according to claim 5, wherein the path-type identifier of the communication path from the interface is identical before and after the handover of the interface.

7. The mobile terminal according to claim 5, wherein the path-type identifier is set by the mobile terminal.

8. The mobile terminal according to claim 5, wherein the signaling message transmitted by the transmitting unit includes the same session identifier to notify the same session identifier as well as the path-type identifier to said all of signaling nodes.

* * * * *